(12) United States Patent
Hamamoto et al.

(10) Patent No.: US 7,584,084 B2
(45) Date of Patent: Sep. 1, 2009

(54) METHOD OF MANUFACTURING FLUTTERING ROBOT USING A FLUID-STRUCTURE INTERACTIVE NUMERICAL MODEL FOR DEVELOPING CONTROLS FOR WING DRIVING APPARATUS

(75) Inventors: Masaki Hamamoto, Sakurai (JP); Yoshiji Ohta, Kashiwara (JP); Keita Hara, Kashihara (JP); Toshiaki Hisada, Setagaya-ku (JP)

(73) Assignee: Sharp Kabushiki Kaisha, Osaka (JP)

( * ) Notice: Subject to any disclaimer, the term of this patent is extended or adjusted under 35 U.S.C. 154(b) by 412 days.

(21) Appl. No.: 10/299,947

(22) Filed: Nov. 19, 2002

(65) Prior Publication Data

US 2003/0130829 A1    Jul. 10, 2003

Related U.S. Application Data

(63) Continuation-in-part of application No. 10/269,181, filed on Oct. 11, 2002, now abandoned.

(30) Foreign Application Priority Data

| Oct. 12, 2001 | (JP) | ............................... 2001-315493 |
| Jul. 15, 2002 | (JP) | ............................... 2002-205586 |
| Oct. 4, 2002 | (JP) | ............................... 2002-292339 |

(51) Int. Cl.
| G06G 7/60 | (2006.01) |
| G06G 7/72 | (2006.01) |
| G05B 13/04 | (2006.01) |
| G05B 19/18 | (2006.01) |
| G09B 9/05 | (2006.01) |
| G09B 9/10 | (2006.01) |

(52) U.S. Cl. ..................... 703/7; 703/6; 703/9; 700/28; 700/29; 700/30; 700/31; 700/245; 700/250; 700/252; 434/28; 244/174

(58) Field of Classification Search ............. 434/28–30; 700/28–31, 245–264, 54; 703/1, 2, 6, 7–9; 244/174

See application file for complete search history.

(56) References Cited

U.S. PATENT DOCUMENTS

| 6,206,324 | B1 * | 3/2001 | Smith ........................... 244/72 |
| 6,512,999 | B1 * | 1/2003 | Dimas et al. ................... 703/9 |

(Continued)

FOREIGN PATENT DOCUMENTS

JP    2000-352545    12/2000

OTHER PUBLICATIONS

Wang, Z. Jane. "Vortex Shedding and Frequency Selection in Flapping Flight." Courant Institute of Mathematical Sciences. 2000. pp. 323-341.*

Ellington, C.P. "The Novel Aerodynamics of Insect Flight: Applicatiuons to Micro-Air Vehicles." 1999. Journal of Experimental Biology 202, pp. 3439-3448.*

(Continued)

*Primary Examiner*—Kamini S Shah
*Assistant Examiner*—Akash Saxena
(74) *Attorney, Agent, or Firm*—Edwards Angell Palmer & Dodge LLP; David G. Conlin; William J. Daley, Jr.

(57) ABSTRACT

A numerical model related to fluttering of an insect, when an equivalent model of actual structure of a wing of the insect is moved in the air in accordance with a model of fluttering motion of the wing of the insect is calculated by fluid-structure interactive analysis, in which behavior of the wing and behavior of the air are given as numerical values, including interaction therebetween. Thereafter, a method of controlling a fluttering robot, wing shape and the like are determined by modifying numerical models of fluttering of an insect prepared by fluid-structure interactive analysis, in accordance with sensitivity analysis. Accordingly, a method of preparing numerical models of wing and air considering the behavior of the wing of the insect in the air is provided and, in addition, a method of manufacturing a fluttering robot utilizing the numerical model prepared by this method of preparing numerical model can be provided.

3 Claims, 26 Drawing Sheets

U.S. PATENT DOCUMENTS

| | | | |
|---|---|---|---|
| 6,568,634 B2 * | 5/2003 | Smith | 244/72 |
| 7,219,855 B2 * | 5/2007 | Hamamoto et al. | 244/72 |
| 7,236,914 B1 * | 6/2007 | Zyskowski | 703/8 |
| 2004/0195439 A1 * | 10/2004 | Hamamoto et al. | 244/72 |

OTHER PUBLICATIONS

Schenato, L. et al. "Virtual Insect Flight Simulator (VIFS): A Software Testbed for Insect Flight." IEEE 2001. ICRA, pp. 3885-3892.*

Fearing, R. S. et al. "Wing Transmission for a Micromechanical Flying Insect." IEEE 2000. International Conference on Robotics & Automation.*

Schenato, L. et al. "Flight Control System for a Micromechanical Flying Insect: Architecture and Implementation." IEEE 2001. ICRA, 1641-1646.*

Kobayashi et al., "Navigation Strategies Referring to Insect Homing in Flying Robots," Proceedings of the 2001 IEEE International Conference on Robotics & Automation.*

Yan et al., "Towards Flapping Wing Control for a Micromechanical Flying Insect," Proceedings of the 2001 IEEE International Conference on Robotics & Automation.*

M. Dickinson, et al., "Wing Rotation and the Aerodynamic Basis of Insect Flight", Science 1999, vol. 284, pp. 1954-1960.

A. Azuma, "The Biokinetics of Flying and Swimming", 1992, pp. 140-143.

Q. Zhang, "ALE (Arbitrary Lagrangian-Eulerian Method) Finite Element Analysis of Structure-Flui Interactive Problem Involving Structural Buckling and Area Deformation", Tokyo University Thesis 1999.

Zhang, et al., "Analysis of fluid-structure interaction problems with structural buckling and large domain changes by ALE finite element method", 2001 Elsevier Science.

Togashi et al., "Flow Simulation of Flapping Wings of an Insect Using Overset Unstructured Grid," Fluids Engineering Conference 2001, Oct. 2-3, 2001 No. 01-3.

Sudo et al., "Motion Analyses of Flying Insects," (Wing Flapping Characteristics of Dragonfly), Transactions of the Japan Society of Mechanical Engineers, Vers. B, Nov. 25, 1994, vol. 60, No. 579.

Ochi et al., "Experimental Study of Beating Motion of Mosquito," (Lift Generated by Flapping Motion), The 13th Bioengineering Conference 2000 Annual Meeting of BE D/JSME, Jan. 15, 2001.

* cited by examiner

METHOD OF MANUFACTURING FLUTTERING ROBOT USING A FLUID-STRUCTURE INTERACTIVE NUMERICAL MODEL FOR DEVELOPING CONTROLS FOR WING DRIVING APPARATUS

This application is a continuation-in-part of U.S. application Ser. No. 10/269,181, filed Oct. 11, 2002 now abandoned, the teachings of which are incorporated herein by reference.

BACKGROUND OF THE INVENTION

1. Field of the Invention

The present invention relates to a method of preparing a fluid-structure interactive numerical model for preparing a numerical model related to a fluid and a numerical model related to a structure when an actual structure as a living organism performs a prescribed motion in the fluid, as well as to a method of manufacturing a fluttering robot using the same.

2. Description of the Background Art

Conventionally, attempts have been made to prepare a numerical model of the manner of fluttering flight that mimics the flight of an insect as an example of a structure of a living organism, with the manner of flight given as numerical expression, by a computer. Further, a simulator or a game of fluttering flight has been known that utilizes the thus prepared numerical model, in which the manner of fluttering flight mimicking an insect is displayed on a display.

In this field of art, it is very useful to analyze a prescribed motion of a structure as a living organism in a fluid, that is, fluttering motion of an actual insect in the air, to know the mechanism of fluttering flight and to use the knowledge for controlling a fluttering robot that flies fluttering. The reason for this is that there is an almost infinite combinations of the manner of fluttering and the wing shapes of insects, and hence a formidable time is necessary to optimize the manner of fluttering or the wing shape of the insect, to meet a requested specification of the fluttering flight, and hence such an approach is impractical. In the course of evolution, insects have their manner of fluttering or wing shapes optimized. Therefore, as can be seen from the fact that bird wings are considered in designing glider wings, the method of obtaining basic principle of fluttering flight from insects is very efficient as compared with other methods.

Further, it is very useful in the industry to prepare a new numerical model by modifying the numerical model related to the air and the numerical model related to the wing structure of an insect obtained from the insect so as to feed back the influence of the modification for better suited wing structure and analysis of the manner of fluttering.

Therefore, in preparing a numerical model of the manner of fluttering, a method has been considered in which wing motion is extracted from images of fluttering flight of an insect picked-up by a high speed camera and obtain data of the extracted wing motion successively by image processing, for example.

In order to analyze air behavior associated with fluttering, a method has been used in which an insect flies in a wind tunnel in which a trace such as a smoke flows and the behavior of the trace is monitored.

Recently, an experiment has been conducted in which a scaled model of a wing is moved in a fluid having high viscosity such as mineral oil, so as to prepare an environment in which the Reynolds number of the fluid is made equal to the Reynolds number of the air, though the manner of fluttering is far moderate than the actual manner of fluttering of an insect, so as to facilitate measurement of velocity when the insect flies fluttering at high speed.

In the above described method, however, it is impossible to simultaneously obtain the behavior of the air as the fluid and the behavior of the insect as a structure of a living organism. Therefore, it has been impossible to prepare a numerical model that involves interaction between the air and the wing of the insect, that is, to prepare a fluid-structure interactive numerical model.

In the following, conventional methods of preparing numerical models will be specifically described.

(1) Method of Getting Numerical Expression of Wing Deformation Using High Speed Camera According to A. Azuma, "The Biokinetics of flying and swimming" Springer-Verlag, Tokyo, 1992, a high speed camera is used, and positions of a line marker marked on a wing of an insect are captured to obtain attitude of the wing. Given the image processing capability of presently used computers, it is possible to obtain numerical expression, including change in shape, the manner of fluttering of a wing, by observing featured portion of the pattern of the entire wing, using video images obtained by the high speed image-pickup.

Though it is possible by this method to grasp the wing behavior, it is not at all possible to grasp fluid behavior. Therefore, when an image is to be displayed on a computer using a numerical model related to the fluttering flight of an insect, for example, it is possible to express fluttering motion, where influence of air flow made by the wing on other structures cannot be calculated.

(2) Fluid Flux Observation Using Trace

A method in which a trace such as smoke is caused to flow in a wind tunnel to visualize the fluid flux of the trace has been long used for analyzing not only the fluttering flight of an insect but general behavior of a fluid.

What is obtained by this method, however, is the shape of the fluid flux of the trace and not the velocity of the flowing trace. Therefore, it has been unsuccessful to obtain numerical model of the fluid behavior.

As a similar method using a trace, a method has been recently applied to measure velocity in a pump, in which colored particles having approximately the same density as the fluid in the pump are caused to flow in the fluid, the manner of movement of the particles is detected by image processing, and the manner of movement is time-differentiated, to measure the velocity.

It is noted, however, that only extremely small particles can float and not fall down, over a long period of time in a fluid having very small density such as air. Therefore, considering the capability of identification by a camera, it is impossible to use this method when the fluid is air.

Consider analysis of fluttering of a dragon fly for one period. The fluttering period of a dragon fly is about 30 Hz, and the velocity caused by the fluttering is about 10 m/sec. Therefore, one particle of the smoke moves by the distance of 30 cm in this period. Therefore, in order to measure velocity of one period of fluttering of a dragon fly, that is, in order to measure the manner of movement of a certain trace, it is necessary to pick-up an image of at least an area of 30 cm×30 cm.

When the area of 30 cm×30 cm is picked-up by a CCD camera having 1000 pixels×1000 pixels, it follows that an area of 300 μm×300 μm is picked-up by one pixel. The diameter of a particle that can float over a long period of time in the air, such as a pollen, is about 3 μm. The seeming area of the particle 3 μm in diameter is only $1/10000$ of the area picked-up by 1 pixel. Assuming that the light reflectance is the same, the trace floating in the air has the luminance of 1/10000 of the luminance of an ordinary object having such an area that can be captured by a plurality of pixels.

The inventors of the present invention conducted an experiment. An object having sufficiently large area is picked-up by a high speed camera under the illumination of 40000 lux. Even in this experiment, only 1024 frames at most could be picked-up in 1 second, using a microlens of 105 mmf 2.8 and a CCD camera comparable to ISO100. When an object moving with to period of about 30 Hz is to be captured with high accuracy as video images, the number of frames as high as 1024 is still insufficient. In order to capture to movement of a particle of 3 μm as video images, it follows that the product of CCD camera sensitivity and the luminance of illumination must be multiplied 10000 times. Therefore, such a method is considered impractical.

(3) Measurement of Fluid Using Scaled Model

M. Dickinson et al. (SCIENCE 1999 Vol. 284 pp. 1954-1960 "Wing Rotation and the Aerodynamic Basis of Insect Flight") noted that fluid having the same Reynolds number behave equivalently, and found a method in which a large scaled wing model is moved at a velocity of at most several Hz in a mineral oil having high viscosity, whereby movement of particles mixed in a fluid that is equivalent to the fluttering of a fly and corresponds to the particles described in item (2) above is detected by image processing, enabling measurement of the movement.

It is truth that when the Reynolds number is the same, fluid of different types behave in the same manner. The behavior of particle structures moving in fluid of different types but having the same Reynolds number, however, differ considerably. Therefore, by this method, it is impossible to correctly grasp deformation of particle structure moving in the fluid.

For example, the relation of velocity $F=s \times f$ always holds where s represents scale and f represents velocity of the air in which an actual fly moves fluttering. As to the deformation D of actual fly wing, wing deformation $D=s \times d$ holds for some deformation d, while it does not hold for other deformation d.

As described above, it has been unsuccessful through conventional methods to prepare an interactive numerical model between fluid and structure. For example, it has been impossible to properly represent a movement of a petal when a butterfly rests on a flower.

By any of the above described methods, it has been impossible to calculate torque for driving the wing, for example, for a fluttering robot that mimics motion of a wing of an insect, since in methods (1) and (2), actual measurement of physical parameters is impossible and in method (3), force used for deformation of the wing is not considered as the wing deformation is different from the actual structure. Therefore, it has been difficult to obtain numerical model of a driving force for driving the wing, which is most important in forming a control mechanism controlling the fluttering flight.

In short, by the numerical models prepared in accordance with the prior art, it has been difficult to obtain numerical expression of motion of a structure, which is a living organism, in a fluid, including fluid-structure interaction.

Further, when a robot mimicking the structure as a living organism is to be manufactured, it has been necessary to design the driving force, allowing for a margin of the driving force, as it has been difficult to calculate the numerical model of driving force for driving the structure as a living organism.

By any of the conventional methods, it is impossible to prepare a numerical model of the manner of fluttering flight of the robot mentioned above. Attempts have been made to actually fabricate the fluttering flight robot as described above, to drive the fluttering robot in various different manners of driving, and to prepare a numerical model of the manner of fluttering drive through trial and error. When the manner of fluttering drive that brings about the manner of motion such as a turn or a change in attitude is to be studied, it is first of all necessary that conditions to lift the fluttering robot are satisfied. Therefore, such a study can be made only under very limited conditions. Therefore, either by the method using a numerical model or by the method through experiment, it has been difficult to efficiently find the manner of fluttering drive of a fluttering robot.

SUMMARY OF THE INVENTION

An object of the present invention is to provide a method of preparing a fluid-structure interactive numerical model including interaction between fluid behavior and behavior of a structure as a living organism, when the actual living structure performs a prescribed motion in a fluid, and to provide a method of manufacturing a fluttering robot using the same.

The present invention provides a method of preparing a fluid-structure interactive numerical model that prepares a numerical model related to the fluid and the numerical model related to the structure, when the structure as a living organism performs a prescribed motion in a fluid.

The method of preparing the fluid-structure interactive numerical model of the present invention includes the actual structure measuring step for measuring physical values related to the actual structure, and the step of preparing equivalent numerical model of actual structure that can be regarded as equivalent to the actual structure, in which the physical values related to the actual structure measured in the actual structure measuring step are given as numerical values.

Further, the method of preparing fluid-structure interactive numerical model of the present invention includes the manner of motion measuring step in which an actual structure is caused to perform a prescribed motion and physical values related to the prescribed manner of motion are measured, and the motion model preparing step for preparing a motion model in which the physical values related to the prescribed manner of motion are expressed as numerical values.

The method of preparing fluid-structure interactive numerical model of the present invention further includes the fluid-structure interaction analysis step, in which, in a preset numerical fluid model for analysis, a prescribed motion represented by a motion numerical model is performed by an equivalent numerical model of actual structure, the numerical model related to the model fluid and the numerical model related to the equivalent numerical model of actual structure are processed to numerical models including interaction between the fluid behavior and the structural behavior.

According to this method, the fluid-structure interactive analysis used for analyzing behavior of a structure other than the living organism is applied to analysis of behavior when a structure as a living organism performs a prescribed motion in a fluid, whereby it becomes possible to prepare the fluid-structure interactive numerical model including interaction between the behavior of the fluid and the behavior of the structure as the living organism.

In the method of preparing the fluid-structure interactive numerical model of the present invention, preferably, the structure includes a first structure and a second structure which is different from but of the same type (species) as the first structure.

Further, the actual structure measuring step includes the first measuring step for measuring physical values related to the actual structure of the first structure, and the second measuring step for measuring physical values related to a featured portion of the actual structure of the second structure.

Further, the step of preparing equivalent numerical model of actual structure includes the step of preparing reference structure numerical model, in which physical values related to the actual structure of the first structure measured in the first step are expressed as numerical values, and the converting step for performing a prescribed conversion on the reference structure numerical model, using physical values related to the actual structure of the featured portion of the second structure measured in the second measuring step, to prepare the equivalent numerical model of actual structure.

Further, in the manner of motion measuring step, physical values related to the manner of motion of the actual second structure are measured.

By such a method, it is possible to have the first structure from which physical values related to the structure are measured and the second structure for which physical values related to the manner of a prescribed motion are measured, as separate structures. Therefore, it becomes possible to use such a method in that the first structure is broken and physical values related to the structure are measured, and the second structure is not broken and the physical values related to the structure are measured. According to such a method, it is possible to measure without damaging at least the second structure. Therefore, such an approach is advantageous in view of environmental protection, as the structure as a living organism is not damaged.

In the method of preparing fluid-structure interactive numerical model of the present invention, preferably, in the first measuring step, shape, mass and rigidity are measured as physical values related to the structure of the first structure, and in the second measuring step, shape and rigidity are measured as physical values related to the structure of the featured portion of the second structure.

According to this method, mass of the second structure is not measured. Therefore, at least the second structure can be measured without breaking or damaging the same. Therefore, an exemplarity method can be provided which is advantageous in view of environment as mentioned above, that minimizes damage to the structure as a living organism.

In the method of preparing fluid-structure interactive numerical model of the present invention, measurement of a prescribed motion may be performed only on a featured portion of the actual structure.

In this method, only the physical values related to the manner of prescribed motion on a featured portion from which the attitude of the actual structure as a living organism can be identified, are measured. Therefore, as compared with an example in which physical values related to the manner of prescribed motion at every portion of the actual structure are measured, the measurement of physical values related to the manner of prescribed motion can be simplified.

In the method of preparing fluid-structure interactive numerical model of the present invention, preferably, the object is a virtual space where unsteady flow is generated, when an actual structure moves therein. By this method, the amount of calculation necessary for fluid-structure interactive analysis can be reduced.

In the method of preparing fluid-structure interactive numerical of the present invention, the structure may be a wing of an insect, the fluid may be air, and the prescribed motion may be a fluttering motion.

Here, it becomes possible to prepare a numerical model related to the air and a numerical model related to the wing structure, including interaction between the behavior of the air and the behavior of the wing of an insect.

In the method of preparing fluid-structure interactive numerical model of the present invention, physical values related to the actual structure of the wing of an insect may be measured, assuming that the actual structure of the wing of an insect mentioned above consists of a collection of shell structures, in the actual structure measuring step.

In this method, utilizing the fact that deformation experienced by the wing of an insect is dominantly bending deformation, a combination of beam and film structures, that is the actual structure of the wing of an insect, is approximated as a collection of shell structures. Accordingly, the amount of calculation for preparing the equivalent numerical model of actual structure can be reduced. Further, measurement of physical values related to the actual structure of the wing of an insect can be simplified, and modeling accuracy of the equivalent numerical model of actual structure can substantially be improved.

In the method of preparing fluid-structure interactive numerical model of the present invention, in the motion model preparing step, the motion model may be prepared by using values obtained by smoothing time-differentiated physical values related to the actually measured manner of motion of the wing.

By this method, it is possible to prevent physical values (velocity, acceleration and the like) of any abnormal manner of motion of the wing from being included in the motion model because of quantization error at the time of measuring the manner of motion.

Further, the aforementioned smoothing may separately be performed on translational motion and rotational motion. Accordingly, it becomes possible to prevent, change due to smoothing in distance between prescribed two points on the wing as the object of measurement of the manner of motion.

In the method of preparing fluid-structure interactive numerical model of the present invention, the aforementioned motion model may consist of position data represented as time sequence, when prescribed three points among actual portions of the wing of an insect change during the prescribed motion.

The wing of an insect is approximately flat, and therefore, when prescribed three points of the actual wing of an insect are replaced by a triangular plane and the manner of prescribed motion is measured, there would be no problem. Utilizing this fact, in the present method, measurement of numerical values representing actual position or attitude of the wing of an insect necessary for preparing the motion model can be simplified.

In the method of preparing fluid-structure interactive numerical model of the present invention, the aforementioned prescribed three points may be selected among portions that are not subjected to deformation by the motion based on the motion model, from actual portions of the wing of an insect. By this method, it is possible to prevent error involved in the measurement of position and attitude of the prescribed three points, which error caused by the deformation of the wing.

Further, the prescribed three points may be selected from portions close to the root of the actual wing of an insect. By this method, it becomes possible to measure position and attitude of the wing at a portion which is relatively free of deformation.

More preferably, a triangle formed by the prescribed three points is a right triangle. In that case, the position and attitude of the prescribed three points can be measured with higher accuracy than when the prescribed three points form other triangle.

In the method of preparing fluid-structure interactive numerical model of the present invention, the actual structure measuring step includes the step of measuring flexural rigidity of the actual wing of an insect. In the numerical model of detailed figure of the actual wing of the insect, thickness may be determined such that flexural rigidity of the model is equivalent to the flexural rigidity of the actual wing measured in the flexural rigidity measuring step.

By this method, it is possible to determine the thickness of the equivalent numerical model of actual structure which deforms equivalently as the actual wing, in an easy and reasonable manner, in the equivalent numerical model of actual structure having the shell structure.

According to an aspect, the present invention provides a method of manufacturing a fluttering robot that includes a wing for fluttering motion, a wing driving apparatus driving the wing in accordance with a numerical model of driving force, and a wing drive control apparatus controlling the wing driving apparatus by applying the numerical model of driving force to the wing driving apparatus.

In the method of manufacturing the fluttering robot in accordance with an aspect, the numerical model of driving force is determined by the numerical model of driving force prepared by the method of preparing fluid-structure interactive numerical model of air and the wing of an insect described above.

By this method, the wing driving apparatus can be controlled by applying numerical model of driving force for driving the wing, instead of a numerical model of the displacement angle of a wing portion, or the numerical model of displacement of the wing. Therefore, design of the method of controlling driving force to the wing driving apparatus is facilitated.

Further it is unnecessary to ensure large margin of the driving force for the wing driving apparatus. Thus, the wing driving apparatus can be reduced in size, and the energy supplied to the wing driving apparatus can be reduced. As a result, the fluttering robot can be made light-weight.

According to another aspect, the present invention provides a method of manufacturing a fluttering robot that includes a wing for fluttering motion, a wing driving apparatus driving the wing, and a wing drive control apparatus controlling the wing driving apparatus.

In the method of manufacturing the fluttering robot in accordance with this aspect, the numerical model of the wing structure of the above described fluttering robot is determined by modifying, in accordance with sensitivity analysis, the equivalent numerical model of actual structure used in the method of preparing fluid-structure interactive numerical model between the air and the wing of an insect described above.

By this method, it becomes possible to manufacture a fluttering robot having a wing structure different from that of an insect, with high efficiency, by modifying the wing structure of an insect as a base.

According to another aspect, the present invention provides a method of manufacturing a fluttering robot that includes a wing for fluttering motion, a wing driving apparatus driving the wing, and a wing drive control apparatus controlling the wing driving apparatus.

In the method of manufacturing a fluttering robot in accordance with this aspect, the manner of fluttering motion of the wing of the fluttering robot mentioned above is determined by modifying, in accordance with sensitivity analysis, the motion model used in the method of preparing fluid-structure interactive numerical model between the air and the wing of an insect described above.

By this method, it is possible to manufacture a fluttering robot that flies in a manner of fluttering different from that of an insect, efficiently, by modifying the manner of fluttering flight of an insect as a base, without the necessity of studying, one by one, the innumerable manners of fluttering flight.

In the method of manufacturing a fluttering robot in accordance with the above described aspects of the present invention, change in numerical model of lift force relative to the change in a prescribed numerical model, may be used as the sensitivity for sensitivity analysis.

According to this method, when the lift force as one of the most important parameters for fluttering flight is made approximately the same as the lift force of an actual insect, it becomes easier to realize stable fluttering flight of the artificial fluttering robot.

According to a still further aspect, the present invention provides a method of manufacturing a fluttering robot, including the step of preparing numerical model related to a structure of an artificial wing, the step of preparing a numerical model of detailed figure that will be a reference for interpolation, and the step of preparing detailed numerical motion model that corresponds to the manner of motion of the numerical model of detailed figure.

Further, according to another aspect, the present invention provides a method of manufacturing a fluttering robot including the step of detailed fluid-structure interactive analysis step for calculating a numerical model related to the structure of the numerical model of detailed figure and the numerical model related to fluid of the numerical model of detailed figure, by performing fluid-structure interactive analysis, using the numerical model of detailed figure and the detailed numerical motion model.

According to a still further aspect, the method of manufacturing a fluttering robot includes the step of preparing a first numerical model of interpolated structure, by interpolating, with a prescribed interpolation ratio, the numerical model related to the structure of the artificial wing and the numerical model of detailed figure.

According to a still further aspect, the method of manufacturing a fluttering robot includes the step of preparing a first numerical motion model of the interpolated structure that corresponds to the first numerical model of the interpolated structure, by modifying the detailed numerical motion model such that change in a specific numerical model becomes smaller than the change in the specific numerical model among the numerical models related to the structure and to the fluid when fluid-structure interactive analysis is performed using the first numerical model of the interpolated structure and the detailed numerical motion model.

According to a still further aspect, the method of manufacturing a fluttering robot includes the step of first fluid-structure interactive analysis, for calculating a numerical model related to the structure of the first numerical model of the interpolated structure and a numerical model related to the fluid of the first numerical model of the interpolated structure, by performing fluid-structure interactive analysis using the first numerical model of the interpolated structure and first numerical motion model of the interpolated structure.

Further, according to a still further aspect, the method of manufacturing a fluttering robot includes the step of preparing a numerical model of a second interpolated structure by interpolating, with a prescribed interpolation ratio, the numerical model related to the structure of the artificial wing and the first numerical model of the interpolated structure.

According to a still further aspect, the method of manufacturing a fluttering robot includes the step of preparing a second numerical motion model for the interpolated structure that corresponds to the second numerical model of the interpolated structure, by changing the first numerical motion model of the interpolated structure such that change in a specific numerical model becomes smaller than the change in the specific numerical model among the numerical models related to the structure and to the fluid when fluid-structure interactive analysis is performed using the second numerical model of the interpolated structure and the first numerical motion model for the interpolated structure.

A method of manufacturing a fluttering robot in accordance with a still further aspect includes the step of second fluid-structure interactive analysis for calculating a numerical model related to the structure of the second numerical model of the interpolated structure and a numerical model related to the fluid of the second numerical model of the interpolated structure, by performing fluid-structure interactive analysis using the second numerical model of the interpolated structure and second numerical motion model of the interpolated structure.

In the method of manufacturing a fluttering robot in accordance with a still further aspect of the present invention, steps similar to the step of preparing second numerical model of the interpolated structure, the step of preparing second numerical motion model of the interpolated structure and the step of second fluid-structure interactive analysis are accumulatively repeated while each of the numerical models described above is updated successively until the numerical model of the interpolated structure matches or is approximated to the numerical model related to the structure of the artificial wing and, thereafter, using the numerical motion model of the interpolated structure that corresponds to the numerical model of the interpolated structure matching or being approximated to the numerical model related to the structure of the artificial wing, the method of controlling the wing driving apparatus is determined for driving the artificial wing.

According to this method, as the numerical model of interpolated structure is interpolated to be closer to the numerical model related to the structure of artificial wing, it becomes possible to realize a manner of fluttering flight that is close to the manner of fluttering flight of the numerical motion model corresponding to the numerical model of detailed figure (for example, the equivalent numerical model of actual structure). As a result, it becomes possible to determine the method of controlling wing driving apparatus driving the artificial wing such that even the wing of the artificial fluttering robot is driven in the manner of fluttering flight that is close to the manner of fluttering flight of the detailed figure (for example, an actual insect).

In the fluttering robot in accordance with a still further aspect of the present invention, preferably, in the step of preparing second numerical motion model of the interpolated structure, the first numerical motion model of the interpolated structure is changed such that change in a specific numerical model of the numerical model related to the structure and the numerical model related to the fluid becomes zero.

By this method, it becomes possible to determine the method of controlling the wing driving apparatus driving the artificial wing such that even the wing of the artificial fluttering robot assumes approximately the same manner of fluttering flight of a detailed figure (for example, an actual insect), as regards a specific numerical model.

More preferably, in the method of manufacturing a fluttering robot in accordance with another aspect of the present invention, the specific numerical model mentioned above is a numerical model of lift force. When the lift force which is one of the most important parameters for fluttering flight is made approximately equal to the lift force of the actual detailed figure (for example, an actual insect), it becomes easier to realize more stable fluttering flight of the fluttering robot having artificial wings.

In the method of manufacturing a fluttering robot in accordance with another aspect of the present invention, the numerical model of detailed figure may be the equivalent numerical model of actual structure used for the method of preparing fluid-structure interactive numerical model described above.

As a result, it becomes possible to determine the method of controlling wing driving apparatus for driving artificial wings such that even the artificial wings of the fluttering robot assume the manner of fluttering flight that is close to the actual manner of fluttering flight of a structure represented by the equivalent numerical model of actual structure, that is, the actual structure of an insect.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

First, referring to Tables 1 to 6 and FIGS. 1 to 20, the method of preparing fluid-structure interactive numerical model in accordance with the first embodiment and the method of manufacturing a fluttering robot using the same will be described.

The method of preparing fluid-structure interactive numerical model of the present embodiment is to prepare a numerical model related to air as the fluid and a numerical value related to the wing structure, obtained by analyzing structure of the wing of an insect and the manner of fluttering flight of the insect, when the insect flies fluttering in the air.

The method of manufacturing a fluttering robot in accordance with the present embodiment is to manufacture a fluttering robot mimicking the structure of the wings of an insect and mimicking the manner of fluttering flight of the insect, using a numerical model prepared by the method of preparing fluid-structure interactive numerical model described above.

Specifically, the numerical model related to the fluid refers to a numerical model of velocity and pressure of the fluid. Further, the numerical model related to the structure mainly refers to a numerical model of the manner of motion such as movement and the deformation of the structure in contact with the fluid, as well as a numerical model of force such as internal stress acting on the structure.

In the method of preparing fluid-structure interactive numerical model of the present embodiment, description will be given on an example in which the numerical model related to the fight of an actual dragon fly is obtained. Specifically, a method of preparing a numerical model related to the structure of the wing of a flying dragon fly and a numerical model related to the air around the wing will be described. More specifically, a numerical model of velocity and pressure of the air around the wing of the fluttering dragon fly, and a numerical model of pressure received by the wing structure of the dragon fly from ambient air, external force (driving force) driving the wing of the dragon fly, forces such as normal stress (pressure or tension) and shearing force on the wing structure of the dragon fly, translational movement or rotational movement of the wing of the dragon fly as well as deformation of the wing of the dragon fly are obtained using the fluid-structure interactive analysis, on the data obtained by measuring fluttering flight of the actual dragon fly in the air. The method will be described in the following.

In the present embodiment, a numerical model is prepared only for physical parts. It is noted, however, that similar method can be applied to numerical models including muscle driving model, nervous system model for driving the muscle, model of information processing at the brain and model of sensing by sense organs that forms the base for information processing.

(Outline of the Procedure for Preparing Fluid-Structure Interactive Numerical Model)

Figure 1:
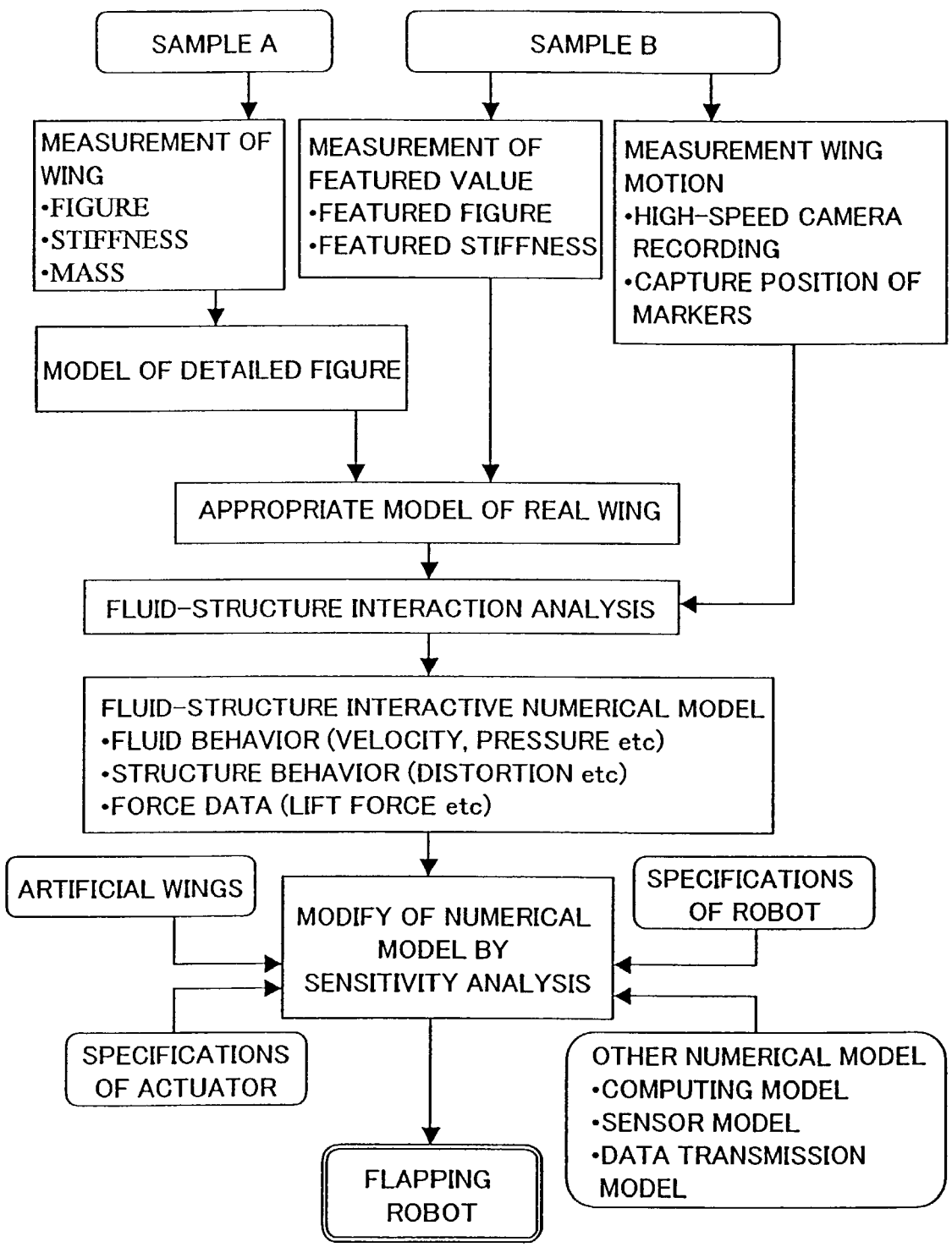
FIG. 1 represents the method of preparing fluid-structure interactive numerical model and a process for manufacturing a fluttering robot in which the fluid-structure interactive numerical model is modified by sensitivity analysis.

An outline of the procedure for preparing fluid-structure interactive numerical model will be described with reference to FIG. 1.

The procedure for preparing the fluid-structure interactive numerical model (hereinafter also simply referred to as "numerical model") in accordance with the present embodiment includes the processes of: 1. measurement of detailed figure; 2. modeling of the detailed figure; 3. measurement of actual structure; 4. preparation of equivalent numerical model of actual structure by interpolation of the detailed figure; 5. measurement of time-sequential data of featured positions of fluttering, 6. modeling of the body (structural portion other than the wings); and 7. fluid-structure interactive analysis.

Through processes 1 to 4, a numerical model equivalent to the actual structure of the wing (hereinafter referred to as "equivalent numerical model of actual structure") that represents shape and rigidity of the wing in numerical values, and through process 5, a numerical model of the manner of fluttering flight of the wing, that is, the driving force model of the wing (hereinafter referred to as "numerical model of fluttering motion") are prepared.

Therefore, it is assumed for simplicity of description that the body model of process 6 is only the shape and mass distribution represented as numerical values. Specifically, the body model is used only for the function of providing boundary condition for the fluid, that is, to provide inertia for rotation or translational movement at the fulcrum of the wing.

Actually, it may be possible to change the position, attitude and the shape of the numerical model of the body. Even when these aspects are considered, the numerical models can be prepared by applying the similar method as preparing the fluid-structure interactive numerical model of the wing, for the change in position, attitude and the shape.

More specific procedure for preparing the numerical model is as follows.

First, a wing of a dragon fly (hereinafter referred to as "Sample A") is separated, for example, as needed, to precisely measure physical values related to the wing structure. Using the measured physical values, numerical model of detailed figure as reference structure numerical model is prepared. Further, physical values of the manner of fluttering flight of another sample (hereinafter referred to as "Sample B") are measured, and using the measured physical values, a numerical model of fluttering motion is prepared.

Next, for Sample B, physical values related to the structures of featured portions of the wing that can be measured without damaging Sample B are measured. Using the data of the physical values of featured portions, the numerical model related to the structure of Sample A, that is, the numerical model of detailed figure is converted, whereby a numerical model that can be regarded as equivalent to the numerical model of the wing structure of Sample B, that is, the equivalent numerical model of actual structure, is prepared.

The behavior of the fluid and the behavior of the structure when the equivalent numerical model of actual structure of Sample B is driven in the fluttering manner directly measured from Sample B are calculated by fluid-structure interactive analysis. Thus, the fluid-structure interactive numerical model at the time of fluttering motion including the influence from the ambient fluid is prepared for Sample B.

The procedure for manufacturing a fluttering robot based on the fluid-structure interactive numerical model obtained through the above described method is as follows.

Each procedure will be described in detail with reference to FIGS. 1 to 14.

(Measurement of Physical Values Related to the Structure of the Numerical Model of Detailed Figure)

First, physical values related to the structure of Sample A are measured for preparing the numerical model of detailed figure. Generally, equation of motion of a structure is given as an expression of external force and acceleration, using a spring and damper, that is, elasticity with respect to displacement and damping ratio with respect to velocity.

Generally, damping of internal stress in a structure occurs when kinetic energy is converted to thermal energy in the structure. This corresponds to occurrence of structural change or destruction. Considering the fact that a dragon fly of which fluttering frequency is 30 Hz continuously flies for more than a week and broken only by outer damage, the structural change in the wing (plastic deformation) in the fluttering motion of several periods can be considered extremely small. Therefore, in the present embodiment, it is assumed that damping of internal stress in the structure is zero. In other words, it is assumed that the wing is subjected to elastic deformation only and not plastic deformation.

Thus, the equation of motion in the structure is given by the elasticity with respect to displacement, that is, rigidity of the wing, mass of the wing and external force.

Namely, there are three parameters necessary for preparing the structural model of the wing, that is, shape, rigidity and mass of the wing. The method of measuring these will be described with reference to FIGS. 2 to 7.

(Measurement of the Shape of Numerical Model of Detailed Figure)

First, measurement of the shape of the wing will be described with reference to FIGS. 2 and 3.

Figure 2:
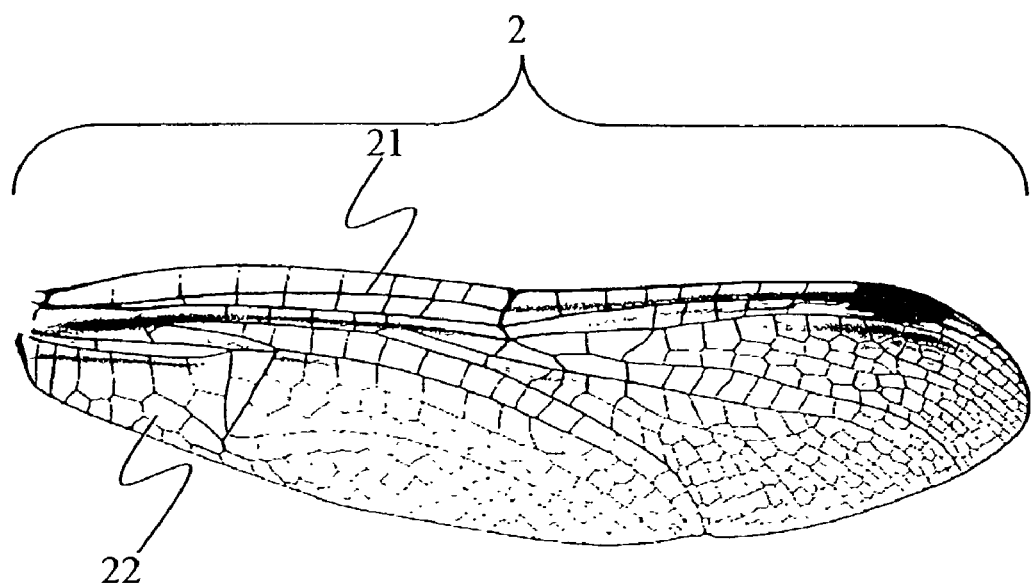
FIG. 2 represents beam and film structures of a wing of an actual insect in accordance with the first embodiment.

As shown in FIG. 2, the wing 2 of a dragon fly used in the present embodiment has such a structure in that a film structure 22 is spun over a branching beam structure 21. For rigidity modeling, which will be described later, it is necessary to grasp positional relation between the beam structure 21 and the film structure 22.

For this purpose, the inventors used the following method for measuring the shape.

First, in order to grasp three-dimensional wing shape, a general, commercially available X-Y stage 33 and a laser distance meter 32 arranged to be able to measure distance in a direction approximately vertical to the main surface of X-Y stage 33 are used.

Figure 3:
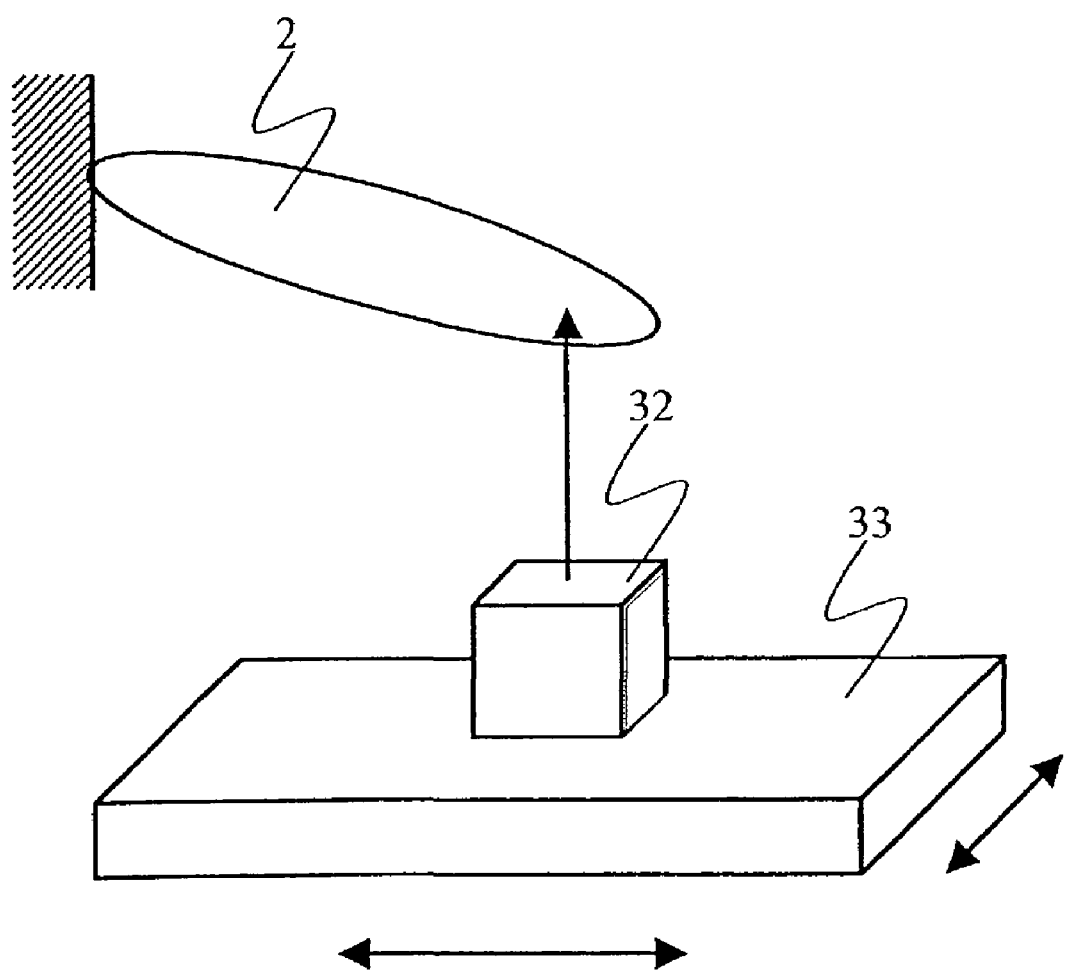
FIG. 3 represents a method of measuring shape of the wing in accordance with the first embodiment.

As shown in FIG. 3, the distance to wing 2 is measured by laser distance meter 32, with the laser distance meter 32 fixed at a certain position on the main surface of X-Y stage 33. Thus, the entire shape of wing 2 is grasped. More specifically, the shape represented as a set of parameters (x (i), y (i), z (i)), using the position of X-Y stage x (i), y (i) by which the position of laser distance meter 32 on the main surface of X-Y stage 33 can be specified, and the measured value z (i) of laser distance meter 32 at this time represents the measured shape of wing 2.

Alternatively, it is possible to obtain an image of wing 2 in a plane approximately parallel to the main surface of X-Y stage 33 by an image picked-up means such as an image scanner or a digital camera, and to obtain the position along the X and Y directions of beam structure 21. When wing 2 is arranged at a position approximately parallel to the main surface of X-Y stage 33, it follows that beam structure 21 exists only at the position of measured value x (i), that is, a position at the distance in the Z direction measured by laser distance meter 32 corresponding to x (i), y (i) measured from the image mentioned above, as beam structure 21 of wing 2 does not exist overlapping in the Z direction.

Accordingly, the arrangement is determined where x, y, z of all the beam structures 21 are considered as the coordinate axes. The method of grasping the shape of wing 2 is not limited to the above, and any method may be used provided that the shape of wing 2 including three-dimensional arrangement of beam structure 21 can be grasped.

For example, in most of commercially available laser distance meters 32, accuracy in measurement lowers when returning laser beam is insufficient. In order to detect a state where the laser beam does not return sufficiently, most of the commercially available laser distance meters 32 have a monitor function for monitoring the returning light intensity of the laser. By the monitoring function, it is possible to calculate reflectance at the time of measurement by the laser distance meter 32. As the film structure 22 of the wing of a dragon fly is almost transparent, it may be possible to use the method of detecting beam structure 21 of wing 2 by mapping magnitude of scattered light with respect to the position of wing 2.

(Measurement of Rigidity of the Numerical Model of Detailed Figure as Reference Structure Numerical Model)

Basically, a general method can directly be applied to the measurement of rigidity of the wing. More specifically, the following method is used. As already described, wing 2 is of a combined structure including beam structure 21 and film structure 22. Therefore, for each featured portion of wing 2, beam structure 21 and film structure 22 are separated from each other. For each of the separated beam structure 21 and film structure 22, tensile strength test, bending strength test or the like is performed, to determine rigidity. Further, a hole of a prescribed shape is opened at a portion of film structure 22. By the deformation of the hole shape, tension exerted on film 22 is reverse-calculated.

The method, however, is disadvantageous as it is complexed. Further, in this method, flexural rigidity is determined as a result of interaction between the beam structure and the film structure, and therefore, error of these two is undesirably involved.

Now, deformation of a wing includes bending deformation and tensile deformation. As the wing of an insect is very thin, deformation caused by bending is dominant in the wing deformation. In other words, the wing of an insect has small distortion and large deformation.

Therefore, in the present embodiment, wing 2 is approximated as a collection of shell structures. Specifically, a combined element of one film structure 22 and beam structure 21 is considered as one shell structure. Therefore, it follows that the rigidity of the wing can be measured with the beam structure 21 and the film structure 22 being in the combined state, thus the entire wing is regarded as a combined body of shell structures. When the entire wing is considered as a combined body of shell structures and the bending rigidity of the wing that mainly determines the behavior of the wing and fluid is directly measured from the wing of an insect, it becomes possible to form a numerical model of detailed figure of the wing having bending rigidity that is close to the bending rigidity of the actual wing of the insect. Further, as compared with a combined element of beam structure and film structure, the amount of calculation for preparing the numerical model of detailed figure can be reduced, as the beam structure is excluded.

It is well possible that measurement must be performed with wing 2 damaged (divided), as each portion of wing 2 is measured individually. Therefore, in view of preparation of the equivalent numerical model of actual structure, which will be described later, it is desirable that measurement of rigidity is performed with the wing 2 dried uniformly.

(Measurement of Mass Distribution of Numerical Model of Detailed Figure)

As already described with respect to rigidity measurement, when the structure of wing 2 is divided into beam structure 21 and film structure 22, what is necessary is to measure mass of each of the beam structure 21 and film structure 22 of featured portions of the wing as divided. When wing 2 is treated as a shell structure, what is necessary is to measure the mass of the combined structure including beam structure 21 and film structure 22, at each portion of wing 2.

Actually, when wing 2 is separated from the living organism, the wing begins to dry and its mass decreases. Therefore, first, at the time point when the wing is separated from the living organism, mass of the entire wing 2 in the normal state is measured. After the wing 2 is sufficiently dried, the mass of the entire wing 2 in the dried state is measured. Thereafter, the dried wing 2 is divided into portions for measurement, and the mass of each of the divided portions is measured. It is desirable to divide the measured mass of each portion of the wing 2 divided in the dried state by the ratio of the mass of the entire wing 2 in the dried state with respect to the mass of the entire wing 2 in the normal state, to obtain the mass of each divided portion of wing 2 in the normal state.

The mass thus obtained is divided by the size of the piece of which mass has been measured, and the resulting value of division is regarded as mass distribution. By dividing the mass of the piece by the area of the piece, the mass per unit area can be calculated, for a shell structure, for example.

Through the above described manner, the shape of wing 2 and rigidity and mass of featured portions of wing 2 are measured.

(Modeling of Detailed Figure as Reference Structure)

Modeling of the structure of wing 2 of Sample A that serves as the detailed figure will be described with reference to FIGS. 2 to 4.

Generally, in a method frequently used for analyzing a structure, the wing 2 is divided into a collection of unit structures, and various physical values are applied to the divided unit structure. The unit structure is generally referred to as a mesh.

In the present embodiment, the unit structure of the wing is regarded as a shell structure. More specifically, wing 2 is represented as a collection of shell structures having physical values including the shape, mass distribution and rigidity as described above.

(Shape Modeling)

As for the shape, the position of a node (intersection point of lines representing a mesh) constituting each mesh is applied. Dependent on the method of analysis, attitude (a plurality of point positional data) of each node is applied.

Here, mesh division is desirably performed taking the direction of beam structure 21 as a reference. It is particularly noted that a recessed/protruded portions referred to as corrugations run with beam structure 21 serving as a ridge, and physical values of wing 2 changes significantly with the corrugations being the order. Therefore, it is desirable that one mesh does not traverse the beam structure 21 (this is the reason why grasping of the arrangement of beam structure 21 is of importance). Except for these points, the method of preparing mesh does not need any modification from the conventionally used methods.

(Rigidity Modeling)

Thereafter, rigidity is applied to each mesh.

The rigidity of a certain mesh, that is, basic parameters that determine modification against a certain external force are Young's modulus, Poisson's ratio and mesh thickness.

As already described, the wing in the present embodiment is characterized in that the distortion is small and the deformation is large. Therefore, deformation of the shell structures is for the most part determined by the product of Young's modulus and the second moment of area. Poisson's ratio has almost no influence on deformation, and therefore a general value of 0.3 is used as Poisson's ratio. In view of preparing equivalent numerical model of actual structure, which will be described later, a rough value may be used as the Young's modulus, such as an average of values resulting from measurements at all the featured portions. Using the bending rigidity measured at each featured portion, the thickness of the mesh is reversed-calculated from the result of numerical calculation or theoretical solution.

For example, when a beam having the length l, height h and width b has one end fixed and a load of w is applied in the height direction on the other end, displacement x of the beam in the height direction is given as $(x=w \times l^3/(E \times b \times h^3/12))$ where x is small as compared with l, and the width b of the shell is found by measurement. Therefore, when Young's modulus E is known, the beam height h can be calculated. Here, it is assumed that $E=1.0 \times 10^9$.

Accordingly, thickness of the mesh at each featured portion is determined, and a value obtained by interpolation thereof is applied to each mesh. Here, the thickness at each featured portion is the thickness for representing bending rigidity of the combined structure of beam structure 21 and film structure 22, and therefore, it is different from the thickness of beam structure 21 itself or the thickness of film structure 22 itself. As an example, the thickness distribution of quad element model using MITC (Mixed Interpolation of Tensolial Components) is shown in FIG. 4.

(Mass Modeling)

The mass can simply be calculated by interpolating mass per unit area calculated from the result of mass measurement at each featured portion. What is necessary is simply to apply a value obtained by multiplying the mass per unit area at the mesh position by the mesh area.

Through the above described steps, a numerical model related to the structure representing shape, rigidity and mass distribution of wing 2 is prepared. In the following, this numerical model will be referred to as the numerical model of detailed figure as reference structure numerical model.

(Preparation of Equivalent Numeral Model of Actual Structure)

Figure 5:
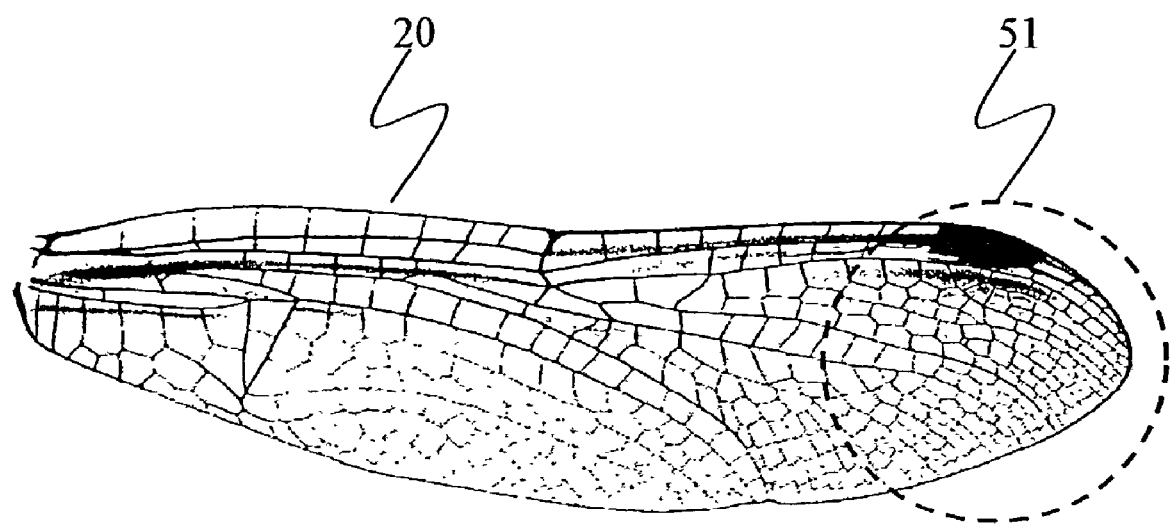
FIG. 5 represents an approximately flat area of a wing, related to the first embodiment.
Figure 6:
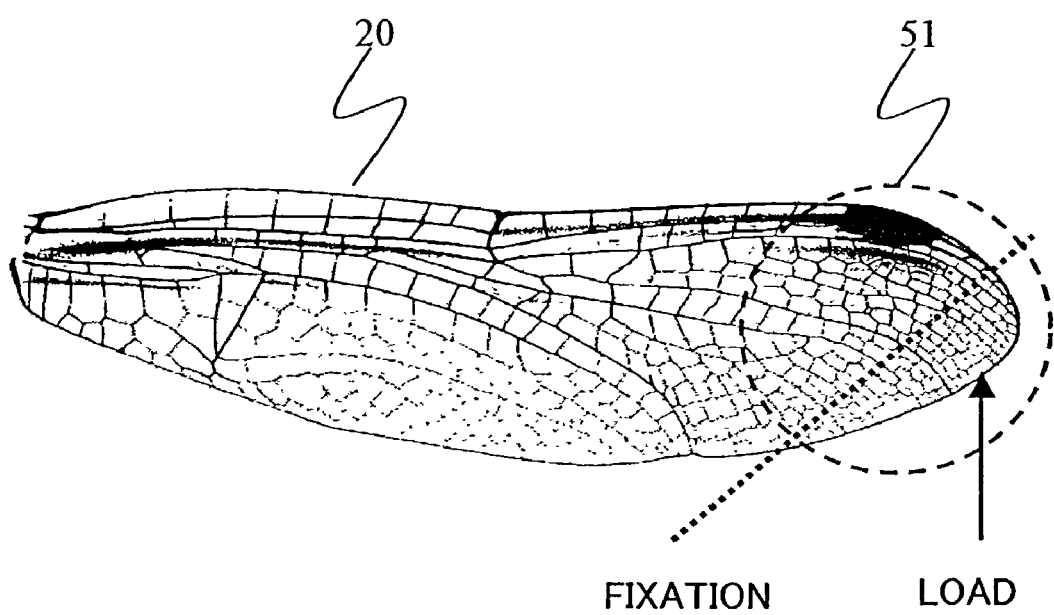
FIG. 6 represents a method of measuring rigidity at a featured portion of a wing in accordance with the first embodiment.
Figure 7:
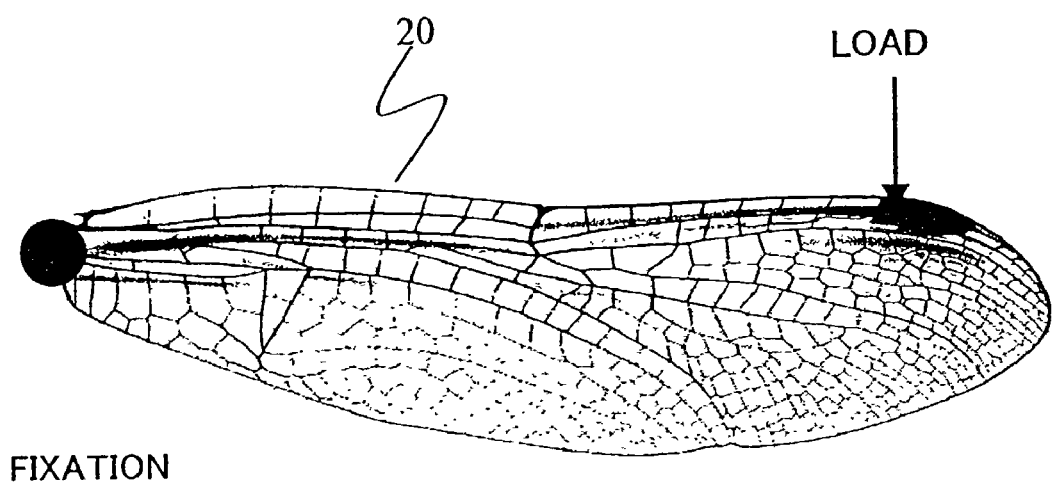
FIG. 7 represents another method of measuring rigidity at a featured portion of a wing in accordance with the first embodiment.

Referring to FIGS. 5 to 7, a method of measuring the shape of a featured portion and rigidity of the featured portion of Sample B without damaging Sample B as a living organism will be described with reference to FIGS. 5 to 7.

(Measurement of Featured Shape)

When feature shape is to be measured, first, distance from a featured structure such as outline of wing 20 or a characteristic branching point of beam structure 21 is measured from a picked-up image, for example, of wing 20. Based thereon, the ratio α of the shape with respect to the numerical model of detailed figure, that is, the ratio of distance from a common reference point to the measurement point with respect to the numerical model of detailed figure of wing 20 is calculated. For example, the outline is measured and when the length of wing 20 in the longitudinal direction in the numerical model of detailed figure is $l_1$ and the outline of wing 20 of Sample B measured here is $l_2$, the shape ratio α is $\alpha=l_2/l_1$.

(Measurement of Representative Rigidity)

Here, the method of measuring rigidity of a featured portion of wing 20 without damaging Sample B as a living organism will be described.

Generally, rigidity is measured by fixing one end of an object, applying a certain load on another portion of the object, and measuring the resulting amount of displacement. Therefore, the object must be fixed firm enough not to cause any variation when the load is applied to another portion. When a living organism is to be measured without physically damaging the same, it is necessary that the load causes minimum possible damage to the wing 20.

Here, the following two methods may be possible to accurately measure the rigidity of featured portions without damaging the wing 20 of the living organism.

One is the method that uses fixing means conforming to the protruded/recessed shape of wing 20. According to this method, however, it is necessary to prepare fixing means that matches difference in shape of individual wing of insects. Therefore, it is troublesome to prepare the fixing means.

Therefore, it is desirable to apply the above described method to such a portion at which difference in shape caused by fixation is small. For example, the rear portion at the tip end of wing 20 shown in FIG. 5 is almost a flat plane. Therefore, this portion is fixed on a line as shown in FIG. 6, and a load is applied to another portion, and the displacement is measured.

Alternatively, a method of fixing a strong portion of beam structure 21 of wing 20, for example, the root portion of beam structure 21 of wing 20 in particular, is also effective. For example, the root of beam structure 21 is fixed as shown in FIG. 7, and the relation between load and displacement is measured at the tip end portion of wing 20.

(Preparation of Equivalent Numerical Model of Actual Structure by Converting Numerical Model of Detailed Figure)

Here, a method will be described in which the equivalent numerical model of actual structure is prepared by converting the numerical model of detailed figure using representative measured values obtained by measuring representative values of the living organism of wing 20, that is, of Sample B.

First, using the ratio $\alpha$ of the shape calculated by the measurement of featured shapes, the numerical model of the detailed figure is enlarged/reduced. The enlarged/reduced model will be referred to as an intermediate model.

Specifically, when the coordinates of the node of each mesh and the thickness of the mesh are represented as P and T, respectively, and when the node coordinates and mesh thickness after converting the values P and T with the ratio $\alpha$ of the shape calculated in accordance with the featured shapes are represented as P' and T', there is the relation P'=P×$\alpha$ and T'=T×$\alpha$. In the intermediate model, the shape and the mass approximately reflect the shape and mass of Sample B.

Thereafter, the same dynamical condition as the condition used for measuring the featured rigidity of Sample B, that is, fixing condition and load condition are applied, as numerical model, to the intermediate model, and the amount of deformation of the structure is calculated by numerical analysis. When displacement under the load equivalent to the rigidity of the featured value of the living organism is $\beta$, Young's modulus E for each mesh is changed to E' which is calculated as E'=E×$\beta$.

More specifically, when a value of displacement under a certain dynamical condition in the intermediate model is 0.5 times the value of displacement under the same condition measured from the living organism, the intermediate model is converted to have the relation between load and displacement comparable to that of the living organism by multiplying Young's modulus of the intermediate model by 0.5.

Accordingly, the model resulting from conversion of Young's modulus of the intermediate model comes to have the shape, mass and rigidity almost the same as those of wing 20 of Sample B. The model will be hereinafter referred to as equivalent numerical model of actual structure. Through the above described process, the equivalent numerical model of actual structure is prepared.

(Measurement of Position of Featured Point of Wing Motion)

Next, a method of preparing a model of the manner of fluttering, that is, the attitude for driving wing 20 (numerical model of position data) based on position measurement of featured point of wing motion of sample B, will be described. The attitude of wing 20 (numerical model of position data) is primarily the manner of driving the actuator itself, that is, position and attitude of the fulcrum of the wing. The fulcrum of the wing, however, is within the body of Sample B, and measurement of the fulcrum is substantially impossible. Measurement from video images picked-up by a high speed camera, for example, enables measurement of point position, whereas it does not enable measurement of attitude.

Accordingly, positions of three points that can be picked-up by a high speed camera are measured, which points have substantially the same position and attitude as the fulcrum of the wing, and the attitude of a plane formed by the three points is considered to be the attitudes of these three points respectively. Thus, the attitude of wing 20 is determined through approximation. More specifically, an area in which the amount of deformation is small, including the fulcrum of wing 20, assumes the same attitude as the fulcrum of wing 20. More specifically, the attitude of the plane formed by the three points in this area represents the attitude of the fulcrum of wing 20. From the foregoing, it follows that the attitude of wing 20 can be represented by position data of the three points included in this area.

More specifically, a method may be considered in which three point markers are provided at positions with smallest possible deformation on wing 20, and from the images of wing 20 picked-up by a high speed camera, for example, the points of point markers are measured. Considering accuracy in determining the attitude, it is desired that the angle formed by three point markers is close to 90°. More preferably, the three point markers should form a right isosceles triangle. Measurement of these positions is performed by measuring positions of the point markers from the images of flight of Sample B picked-up at high speed.

As the method of measuring position of the points, a conventional method of measuring position of a prescribed point of the wing is used. In the method of preparing fluid-structure interactive numerical model of the present embodiment, the positions of the point markers are calculated using positions on the images picked-up by high speed cameras from two directions. It is noted, however, that the images picked-up by the high speed cameras are quantized. Therefore, in the method of preparing fluid-structure interactive numerical model of the present embodiment, smoothing is performed to alleviate position deviation of the prescribed points resulting from quantization error. The force exerted by the fluid is a function of velocity. Therefore, it is desirable to perform smoothing on time history of velocity, which is the time history of the positions of point markers mentioned above differentiated by time. The aforementioned time-history of velocity must be continuous (continuous function) to enable smoothing. When smoothing is performed on time-differentiated value of the time-history of positions in the rectangular coordinates directly, it is possible that the distance between point markers may vary. Therefore, it is more desirable that the smoothing is performed on the translational velocity and angular acceleration of the plane formed by the three points, that is, the position and attitude of the plane formed by the three points separated. The method of measuring point positions is not limited to the method described above, and any method that can determine positions of certain three points of wing 20, that is, any method that can determine the attitude of a prescribed area of the wing, may be used.

In the following, the equivalent model of actual structure used for the fluid-structure interactive analysis of the present embodiment will be specifically discussed with reference to FIGS. 15 to 19.

Figure 15:
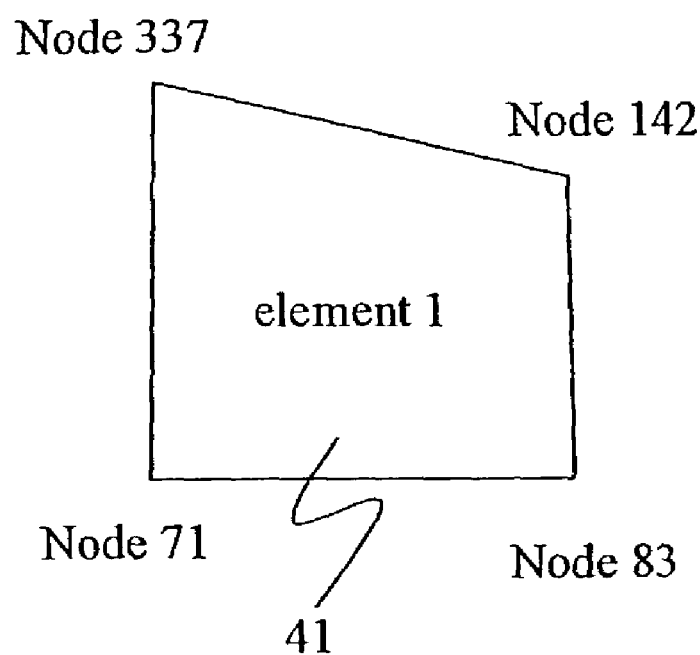
FIGS. 15 to 19 represent specific examples of the equivalent numerical model of actual structure in accordance with the first embodiment.
Figure 16:
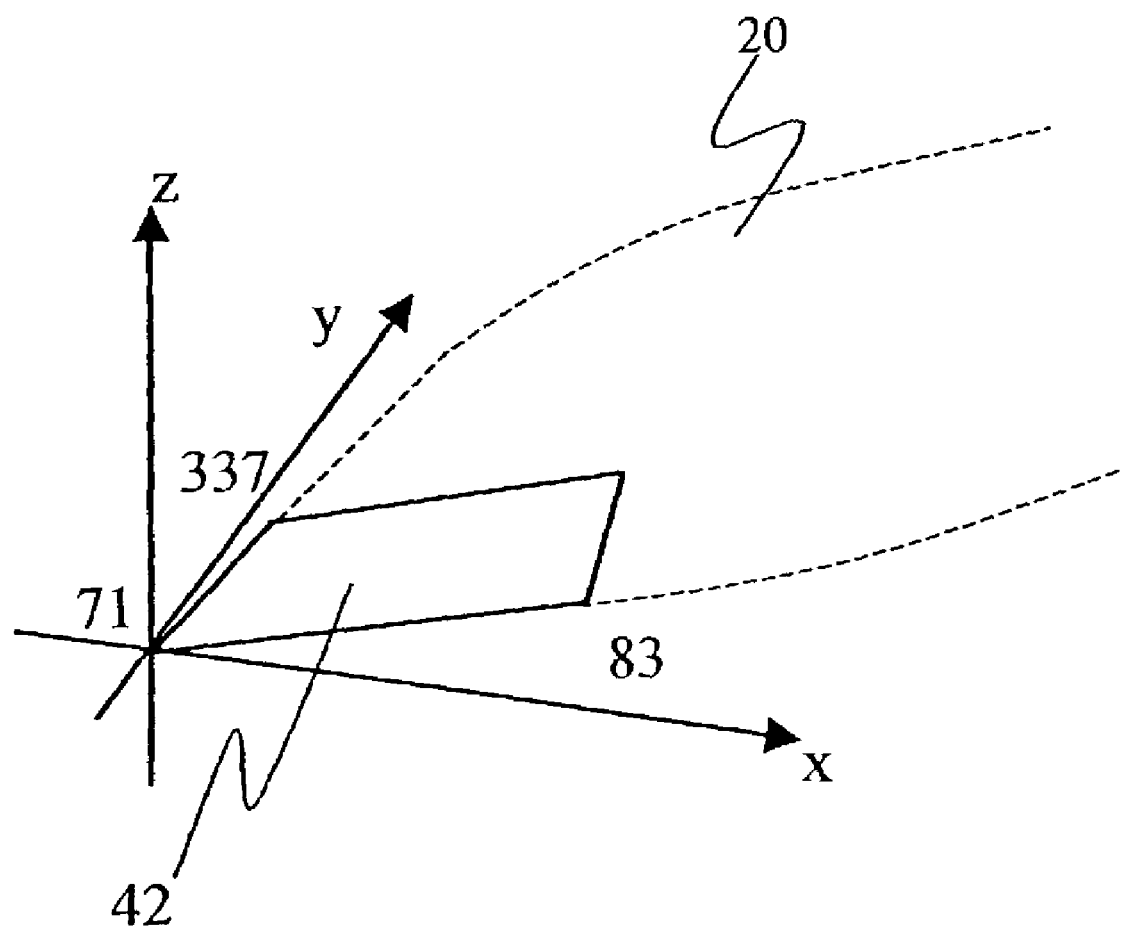

In the present embodiment, positions of these three points are given for the element at the root of the wing. FIG. 15 represents an element at the root of the wing shown in FIG. 4, that is, the element at the lower left corner extracted, with node numbers and the element number used for the analysis in accordance with the present embodiment added. Here, hovering state is assumed, and node 71 is fixed at the origin, that is, (0, 0, 0). The attitude of the wing is represented as numerical model by the time-history of the positions, that is, x, y z coordinates of the remaining two points, that is, nodes 83 and 337.

Figure 17:
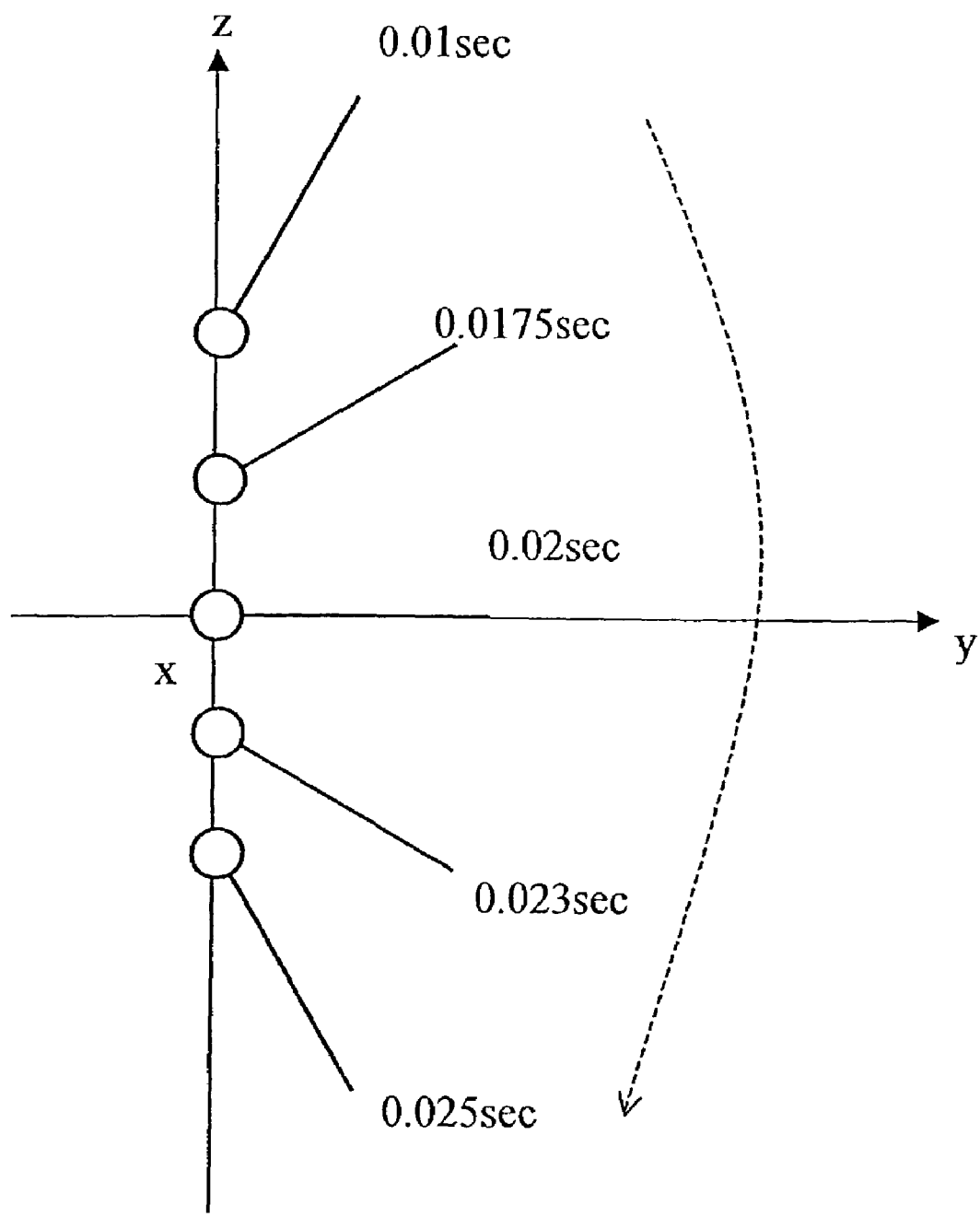
Figure 18:
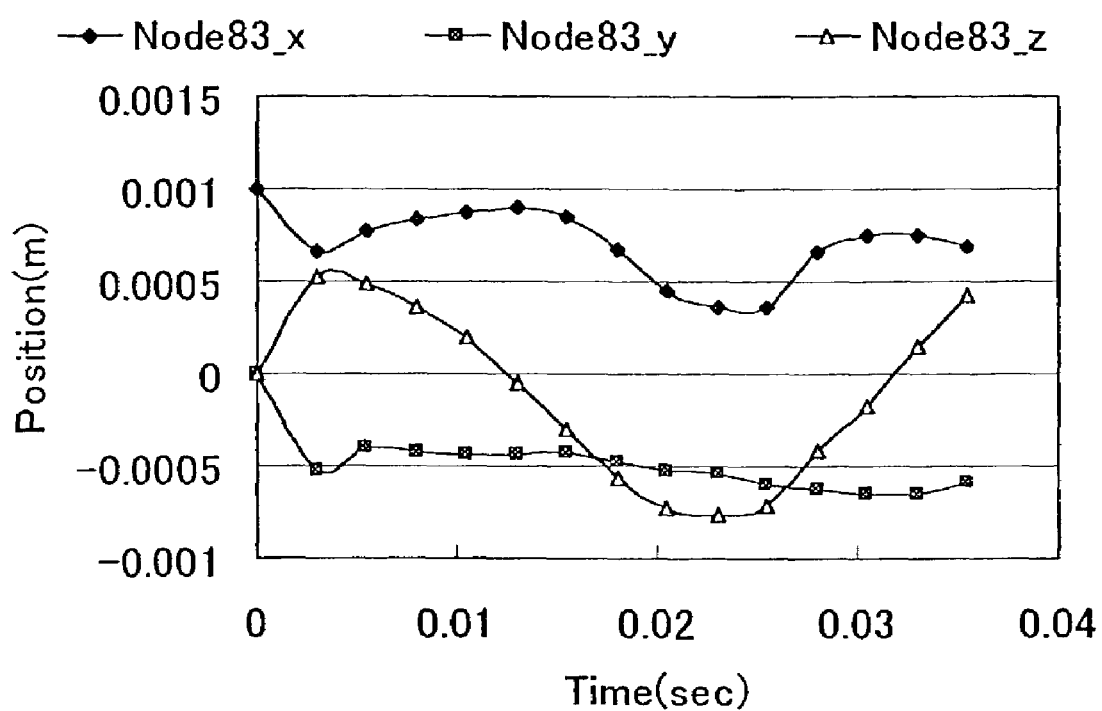
Figure 19:
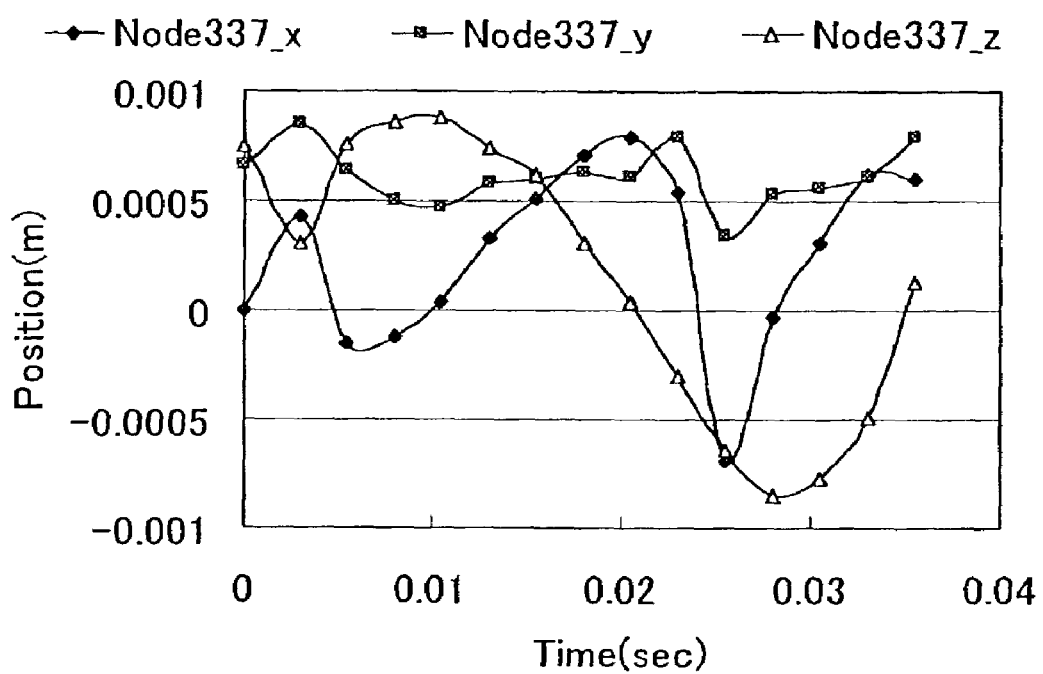

FIG. 17 represents the behavior of the wing calculated in accordance with the reference of Azuma et al. mentioned above, in the coordinate system shown in FIG. 16, for a down stroke of the wing, along with time. FIGS. 18 and 19 represent time-history of x, y and z coordinate values of node 83 and node 337, respectively.

(Fluid-Structure Interactive Analysis)

Here, the method of preparing a numerical model by fluid-structure interactive analysis will be described with reference to FIGS. 4 to 11, 15 and 20.

The method of analysis used by the inventors is the strong coupling method of fluid and structure, in accordance with ALE finite element analysis method proposed by Qun Zhang, Computer methods in applied mechanics and engineering 190 (2001) pp. 6341-6357 "Analysis of fluid-structure interaction problems with structural buckling and large domain changes by ALE finite element method" and (Tokyo University Thesis, 1999, "ALE (Arbitrary Lagrangian-Eulerian Method) Finite Element Analysis of Structure-Fluid Interactive Problem Involving Structural Buckling and Area Deformation"). The method of application thereof will be discussed in the following. Here, ALE refers to a method in which Eulerian notation (fluid) and Lagrangian notation (structure) are handled uniformly, using a reference coordinate system. Further, the finite element method refers to a method of solving an equation provided by dividing the area to be analyzed into a finite number of elements and integrated by approximation within the elements. Different from the difference method, this method enables handling of free shapes, and convergence properties thereof have been proven mathematically.

First, it is necessary to set a virtual space for preparing the numerical model. According to the calculations made by the inventors, when the wing has a length of 4 cm and fluttering frequency of 30 Hz, the air flow is almost a steady flow at a distance of about 20 cm and further. Therefore, when a spherical space having the radius of 20 cm including the structure for preparing the numerical model is considered to be the object of fluid-structure interactive analysis, the amount of calculation can be reduced.

For simplicity of description here, it is assumed that a fluid-structure interactive numerical model is prepared for an example in which a dragon fly is positioned approximately at the center of a cubic case each side of which is 20 cm in length, and the dragon fly is hovering.

In the ALE finite element method, the following four parameters A to D must be set both for the fluid and the structure. In the following, it is assumed that A represents coordinates of each node, B represents connectivity of each node, C represents boundary condition of each node and D represents physical values of each element.

(Structure Element)

The parameters A, B and D are determined at the time point when the equivalent numerical model of actual structure is prepared.

As for the parameter C, position data represented time-sequentially of the markers on wing 20, measured as the numerical model of fluttering motion, are given as forced displacement of the node of the mesh of the equivalent numerical model of actual structure.

(Fluid Element)

Figure 8:
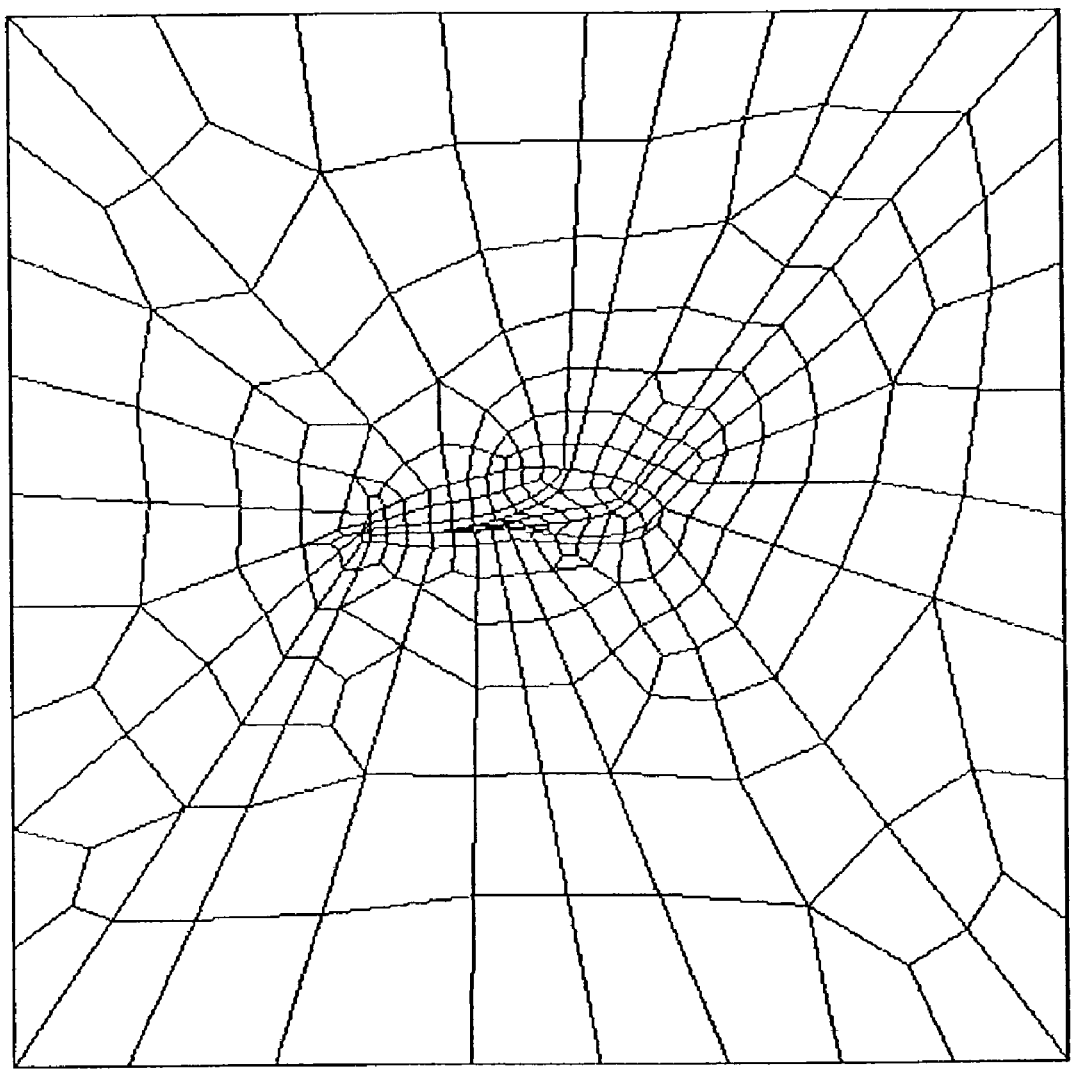
FIG. 8 illustrates a method of preparing fluid mesh in accordance with the first embodiment.
Figure 9:
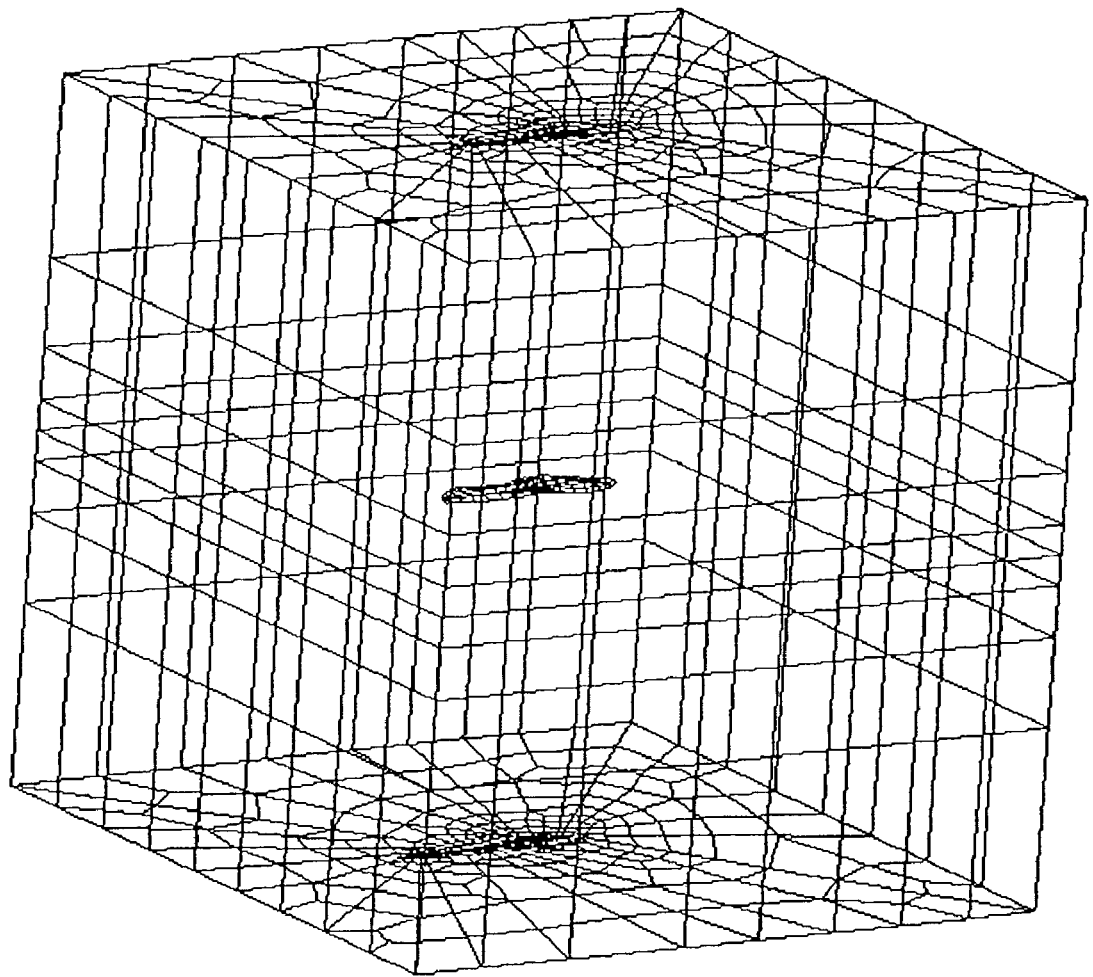
FIG. 9 represents an outline of the fluid mesh in accordance with the first embodiment.

There is no mesh prepared for the fluid element, and therefore, it is prepared by using a commercially available mesh preparing software, for example. In the fluid-structure interactive analysis method used by the inventors, it is necessary to use nodes common to the structural mesh also in the fluid mesh. Therefore, first, a mesh of a plane including the wing is prepared by tetragonal elements, and the thus prepared mesh is swept upward and downward, to prepare a hexahedron mesh. Tetragonal meshes other than the wing are deleted after the preparation of hexahedron mesh. These operations are represented in FIGS. 8 and 9.

In this manner, coordinates and connectivity of respective nodes are prepared for fluid element as well. Further, as the boundary condition, a fixation boundary condition is given to the node of the wing and the nodes forming the outer wall of the cubic case and, in addition, mass density, coefficient of viscosity and bulk modulus of the air are given as physical values of each fluid element.

In order to obtain a numerical model related to the manner of motion converged to the steady hovering state, the inventors analyzed a state in which fluttering of one period is repeated for a plurality of times.

(Actual Data)

The data actually used for analysis will be described with reference to Tables 1 to 6.

Coordinates of each node are common to fluid and structure. Therefore, as shown in Table 1, respective nodes are denoted by Node 1, Node 2, . . . , with respective x, y and z coordinates listed together. In Table 1, such data are referred to as NodeCoords.dat.

TABLE 1

NodeCoords.dat

| Index | x | y | z |
|---|---|---|---|
| Node 1 | −0.03616 | 0.03895 | 0.04457 |
| . | . | . | . |
| . | . | . | . |
| . | . | . | . |
| Node71 | 0 | 0 | 0 |
| . | . | . | . |
| . | . | . | . |
| Node83 | 0.001 | 0 | 0 |
| . | . | . | . |
| . | . | . | . |
| . | . | . | . |

TABLE 1-continued

NodeCoords.dat

| Index | x | y | z |
|---|---|---|---|
| Node337 | 0 | 0.001 | 0 |
| . | . | . | . |
| . | . | . | . |
| . | . | . | . |

Thereafter, it is necessary to designate connectivity of the nodes forming the wing, so as to designate the wing structure. Thus, for Element1 shown in FIG. 15, Node71, Node83, Node142 and Node337 are designated counterclockwise from the lower left corner, to represent the quad shell element. More specifically, respective shells forming the wing are labeled with numbers such as ShellElement1, ShellElement2, ... as shown in Table 2, and listed together with node numbers in the order as described above. Such data is referred to as ShellMesh.dat in Table 2.

TABLE 2

ShellMesh.dat

| element index | left front | right front | right back | left back |
|---|---|---|---|---|
| ShellElement 1 | 71 | 83 | 149 | 337 |
| . | . | . | . | . |
| . | . | . | . | . |
| . | . | . | . | . |

Similarly, connectivity is designated for the mesh prepared for the fluid area. Here, the fluid area is represented as hexahedron element. Further, in order to represent scalar amount of pressure, an additional node, which is referred to as pressure node, is added to each fluid mesh. The order of designating connectivity is as follows. Four points on the lower surface of the hexahedron element are continuously denoted counterclockwise, four points on the upper surface are thereafter designated also counterclockwise, and finally, the pressure node is designated, by the node numbers. Thus, a set of connectivity of a total of 9 points is given as shown in Table 3. In Table 3, such data is referred to as FluidMesh.dat.

TABLE 3

FluidMesh.dat

| element index | left front bottom | right front bottom | right back bottom | left back bottom | left front top | right front top | right back top | left back top | Pressure |
|---|---|---|---|---|---|---|---|---|---|
| FluidElement1 | 71 | 83 | 149 | 337 | 99 | 221 | 414 | 66 | 121 |
| . | . | . | . | . | . | . | . | . | . |
| . | . | . | . | . | . | . | . | . | . |
| . | . | . | . | . | . | . | . | . | . |

Further, it is necessary to add physical values to fluid and structure, respectively. Table 4 is to apply physical values of the structure, and Table 5 is to apply physical values of the fluid. These are referred to as ShellMaterial.dat and FluidMaterial.dat, respectively. In ShellMaterial.dat, Young Modulus, Poisson's Ratio, mass density(densimeter) and thickness are listed, for each structural element of the wing. In FluidMaterial.dat, viscosity, mass density(densimeter) and bulk modulus are listed for each fluid element.

TABLE 4

ShellMaterial.dat

| element index | Young's Modulus | Poisson's Ratio | Mass Density | Thickness |
|---|---|---|---|---|
| ShellElement 1 | 1.00E+09 | 0.3 | 1.20E+03 | 0.35E−03 |
| . | . | . | . | . |
| . | . | . | . | . |
| . | . | . | . | . |

TABLE 5

FluidMaterial.dat

| element index | Viscosity | Mass Density | Bulk Modulus |
|---|---|---|---|
| FluidElement 1 | 1.81E−05 | 12 | 1.00E+05 |
| . | . | . | . |
| . | . | . | . |
| . | . | . | . |

Further, Table 6 represents time-history of x, y and z coordinates at the nodes of the wing, in ShellMotion.dat.

TABLE 6

ShellMotion.dat

| Node/Time (sec) | 0 | 0.0025 | 0.005 | ... | 0.035 |
|---|---|---|---|---|---|
| Node71_x | 0 | 0 | 0 | ... | 0 |
| Node71_y | 0 | 0 | 0 | ... | 0 |
| Node71_z | 0 | 0 | 0 | ... | 0 |
| Node83_x | 0.001 | 0.000669 | 0.000772 | ... | 0.000689 |
| Node83_y | 0 | −0.00053 | −0.0004 | ... | −0.00059 |
| Node83_z | 0 | 0.000523 | 0.00049 | ... | 0.000423 |
| Node337_x | 0 | 0.00043 | −0.00015 | ... | −0.0006 |
| Node337_y | 0.000656 | 0.000848 | 0.000636 | ... | −0.00079 |
| Node337_z | 0.000755 | 0.000309 | 0.000758 | ... | −0.00013 |

The data described above are examples only, and data format and the values are not limited thereto.

[Results of Calculation]

In the following, an example of the numerical model obtained through the above described method will be discussed. The numerical model is obtained from the data listed above, and the numerical model is not limiting.

Figure 10:
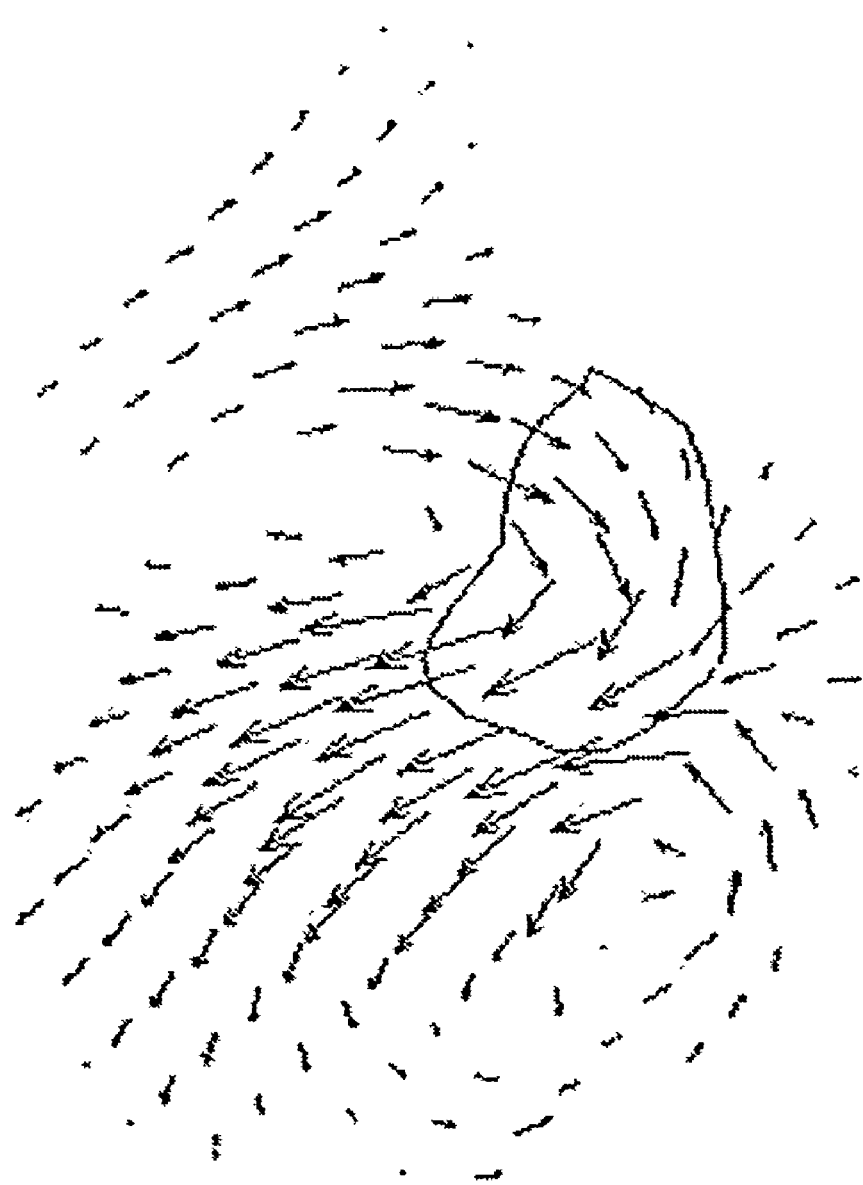
FIG. 10 represents fluid behavior of the fluid-structure interactive numerical model in accordance with the first embodiment.

FIG. 10 represents the results of calculation of the fluid behavior around the wing 20 in a steady state, represented as a numerical model. Arrows represent velocity distribution around the wing 20. Considering the time of calculation, in FIG. 10, velocity distribution analyzed by a half model, in which the body structure is omitted and only one wing operates, is given. Further, in order to avoid complexity of display, only the velocity distribution on a cross section vertical to the wing 20 is given.

Figure 11:
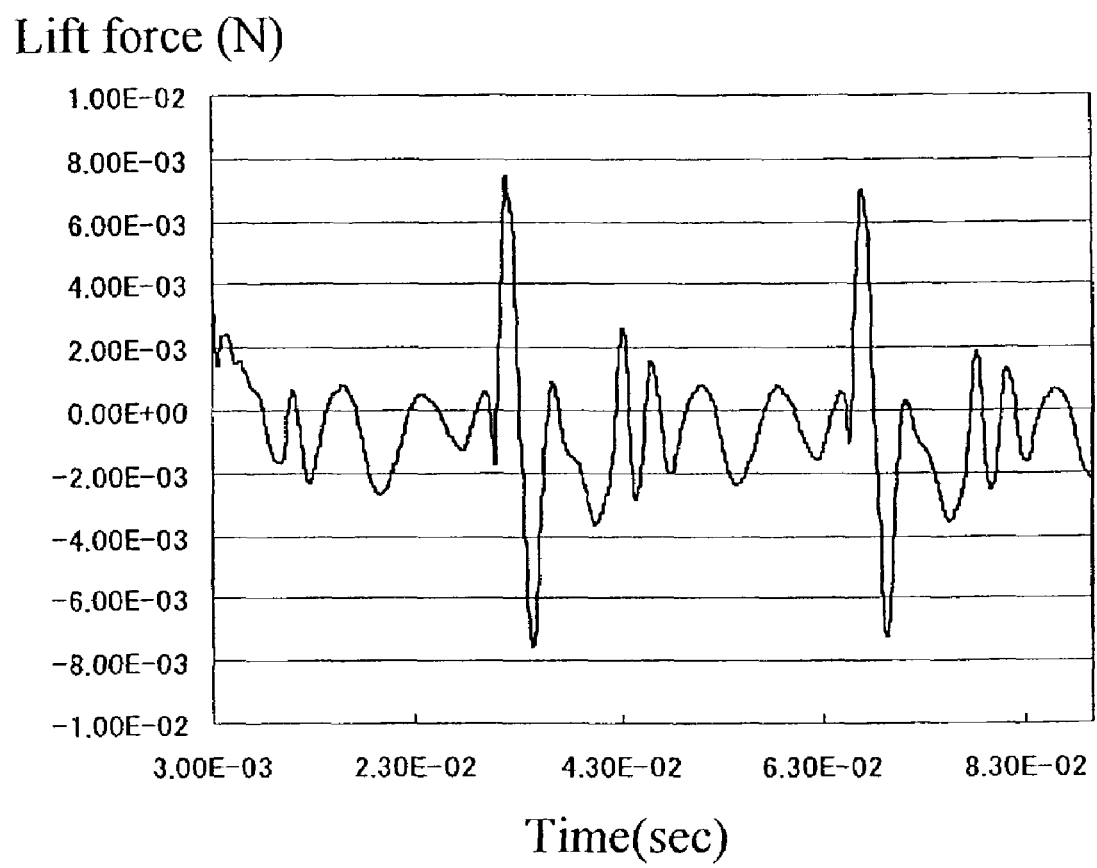
FIG. 11 represents transition of fulcrum reaction on a fulcrum of a wing, when the fluid-structure interactive numerical model flutters, in accordance with the first embodiment.

FIG. 11 represents the total nodal force in the direction of y axis at nodes 71, 83 and 337 calculated by this method. As the forced displacement is exerted on these three points, the total of nodal forces at these points represent the force exerted on the body. The nodal force, which is irregular in the initial state, eventually converges to a periodic behavior. Specifically, the behavior of the fluid and the behavior of the structure both become periodic at this time point, which are equivalent to the behavior of the fluid and the behavior of the structure at the time of hovering. It is noted, however, that the direction of generation of the lifting force is the negative direction along the y axis, as shown in FIG. 17. According to the calculation made by the inventors, under the condition of gravitational acceleration of 9.8 m/sec$^2$, it is possible to lift a mass of about 0.1 g by one wing, as can be seen from FIG. 11.

Figure 20:
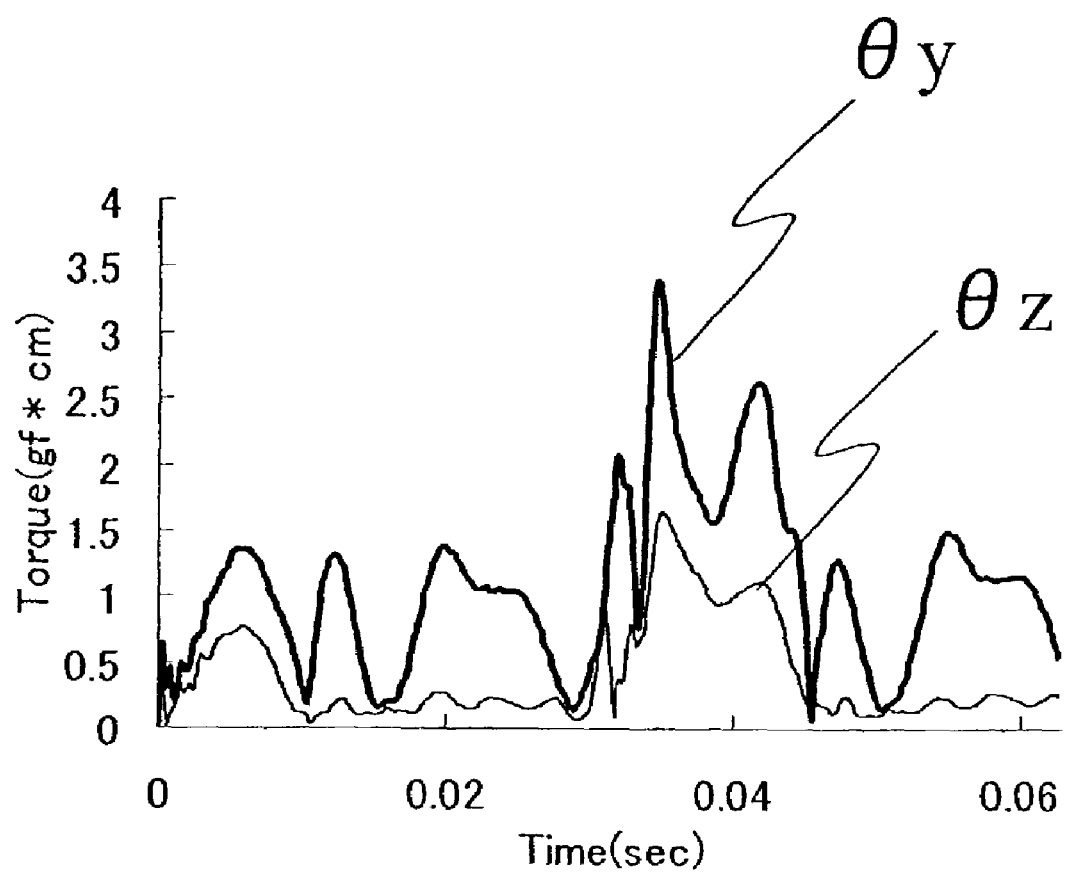
FIG. 20 is a graph representing driving torque exerted on the equivalent numerical model of actual structure in accordance with the first embodiment.

FIG. 20 shows the driving torque exerted on the wing at this time. Here, θy represents torque in the direction of right turn in the positive direction along the y axis, and θz represents a torque in the direction of right turn along the positive direction of the z axis.

The torque is the driving torque itself of the actuator, and therefore, from the data above, we can say that a mass of 0.1 g can be lift up from the ground by one wing, using an actuator having the torque of 1.5 gf·cm to 3.5 gf·cm.

Accordingly, it is possible to prepare a numerical model of flow for steady hovering, and hence it is possible to calculate weight that can be lifted and the torque of the actuator realizing such an operation.

(Application of the Result of Analysis to Manufacturing of a Robot)

Here, the method of applying the numerical model of fluttering including fluid to the method of controlling a robot will be described with reference to FIGS. 1 and 11 to 14.

The numerical model obtained through the above described method can directly be applied to control of a fluttering robot, as will be described later. Alternatively, it may be possible to clarify air dynamic force utilized by an insect from the numerical model itself obtained from the fluid-structure interactive analysis, and to manufacture a fluttering robot utilizing the clarified air dynamic force. In actual manufacturing a fluttering robot, it is very useful industrially, to modify the fluid-structure interactive numerical model using sensitivity analysis, and to determine structure of the wing of the fluttering robot or to determine the manner of fluttering flight, based on numerical model changed in accordance with the sensitivity analysis.

In the following, method of preparing actuator control method, and obtaining manner of fluttering of wings having different shapes, which are particularly useful in preparing the control method of fluttering robot, will be described.

(Method of Preparing Actuator Control Method)

Figure 12:
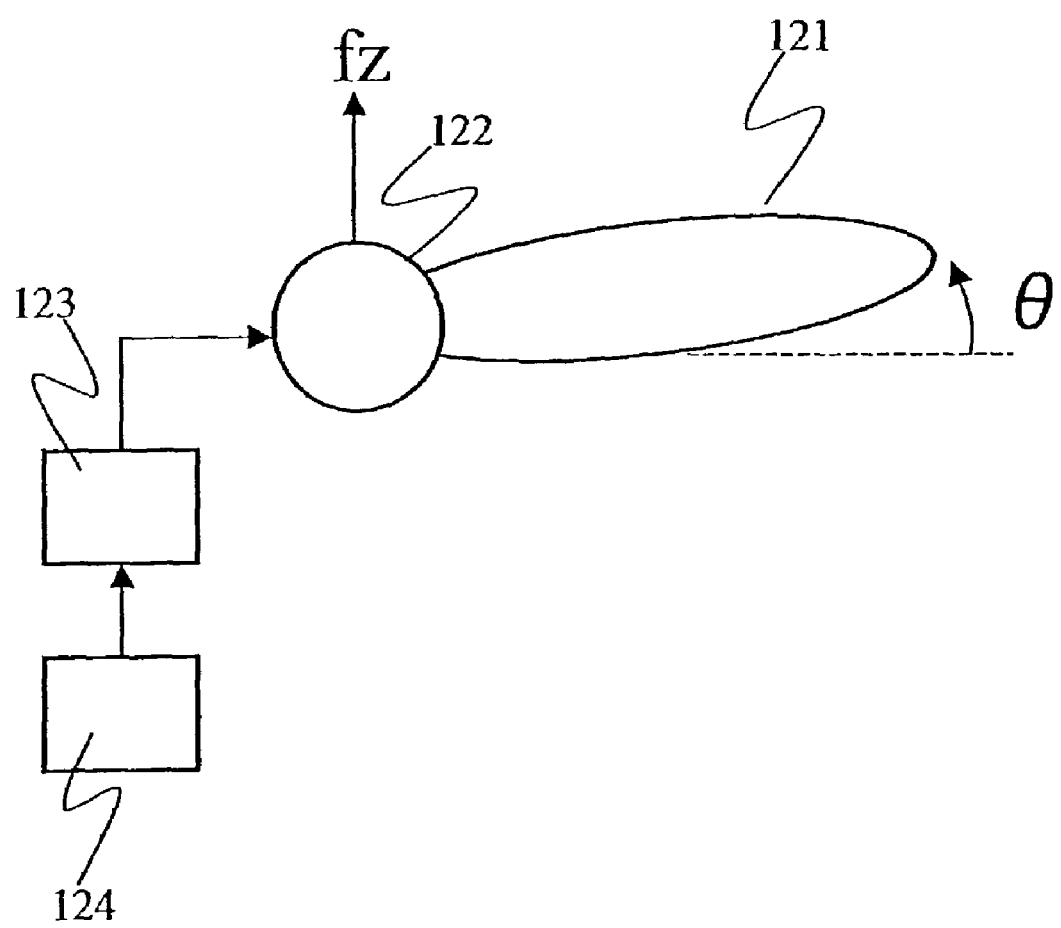
FIG. 12 represents a schematic configuration of the fluttering robot in accordance with the first embodiment.

FIG. 12 is a schematic diagram representing a fluttering robot control system.

For simplicity of description, an actuator 122 and the control system thereof will be described assuming that the actuator has a degree of freedom of 1, driving a wing 121 in upstroke and downstroke directions, and control of only one wing among the plurality of inherently provided wings is controlled. A method of moving the wing 121 in the similar manner as the wing of an insect will be considered. The manner of fluttering flight of the fluttering robot will be represented as time-sequential data of the angle θ of the wing 121 made with respect to a horizontal plane.

Generally, actuator drive is realized by designating power (numerical value of driving force) of the actuator. Therefore, when there is no model of driving force of the actuator, a mechanism is necessary that converts displacement of a wing to the driving force model, by measuring the displacement of the wing. The reason for this is as follow. Even when the driving force (power) of the actuator is constant, displacement of the wing differs dependent on the load acting on the wing. For example, the driving force (power) of actuator 122 shown in FIG. 12 for placing wing 121 at a certain attitudes differs as the force received by the wing 121 from the fluid varies dependent on the velocity of wing 121.

Further, in an actuator of the type that controls feeding-back the displacement of the wing, that is, time-sequential data of a prescribed position of the wing, it is necessary from its nature that the driving force (power) necessary when the wing reaches a target position must be obtained before the time when the wing reaches the target position. Therefore, excessive energy is necessary. As a result, the size of the actuator itself is increased.

The power necessary for controlling actuator 122 is determined by the interaction between the fluid and the structure. Therefore, in this method, how much power is necessary for driving the wing is determined for the first time after the actual wing structure is manufactured. Therefore, it is necessary to determine specification of actuator 122 with considerable margin for the power of the actuator. Therefore, when the actuator actually drives to realize the motion of wing 121 captured from images picked-up by a high speed camera, it is necessary to provide a considerable margin for the power of the actuator.

On the contrary, when control of actuator 122 is possible simply by controlling power generated by actuator 122, it means that an actuator having necessary and sufficient power can be driven with necessary and sufficient energy. Here, the wing is controlled including the load acting on the wing. Therefore, control to adjust deviation resulting from the load on the wing becomes unnecessary.

Therefore, when the fluid-structure interactive numerical model described above is utilized, the torque for driving actuator 122 is given directly, and therefore, the method of controlling actuator 122 can readily be prepared.

According to this method, flight with actuator and energy source that are lighter in weight becomes possible, and therefore, application of this method is quite useful for the fluttering robot.

It is noted, however, that addition of an apparatus for detecting wing position to the fluttering robot and feeding back the time-sequential data of the wing position from the apparatus are useful to absorb error in driving, for example. Therefore, it is not the case that provision of an apparatus for detecting wing position on the fluttering robot is unnecessary.

When a relation between voltage and torque on actuator 122 shown in FIG. 12 is measured with respect to actuator 122, it becomes possible to directly determine the voltage used for control. Therefore, a signal to be generated to actuator drive circuit 123 is maintained in control apparatus 124, and at the time of control, control apparatus 124 transmits the signal to actuator drive circuit 123 so as to output the determined voltage, whereby desired fluttering control is realized.

(Manufacturing of Fluttering Robot Based on the Numerical Model)

In most cases, an actuator manufactured by men has characteristics different from the muscle of an insect. Therefore, it is not always true that driving identical with the driving by a muscle of the insect is optimum.

Further, it may sometimes be inefficient to manufacture a structure equivalent to the wing 20, considering the complexity of the structure of the actual wing.

On the contrary, if it is possible to grasp influence on the driving force model when the structure model or the numerical model of fluttering motion is modified, it becomes possible to derive control of the manner of fluttering flight other than the manner of fluttering of a dragon fly using the wing of the dragon fly, for example. Therefore, it becomes possible to realize wide variety of modifications in design and operation of a fluttering robot.

Here, a method of manufacturing a fluttering robot having wings will be described, in which the fluid-structure interactive numerical model of fluttering flight of Sample B obtained through the above described process is used as the base, and applying a method generally referred to as sensitivity analysis to the base, the base numerical model is deformed.

(Various Sensitivity Analysis)

First, sensitivity analysis related to the shape of a wing 131 will be described. The sensitivity analysis refers to an operation in which the shape of wing 131 is slightly modified, and by comparing the numerical model related to the fluid and numerical model related to the structure resulting from the above described series of fluid-structure interactive analysis with the numerical model related to the fluid and the numerical model related to the structure before the change in shape, sensitivity, that is, the degree of change in a target parameter with respect to the change in shape of the wing 131 is obtained. In other words, sensitivity analysis refers to an operation to find a change in a prescribed numerical model caused by the change in the numerical model of the shape.

Figure 13:
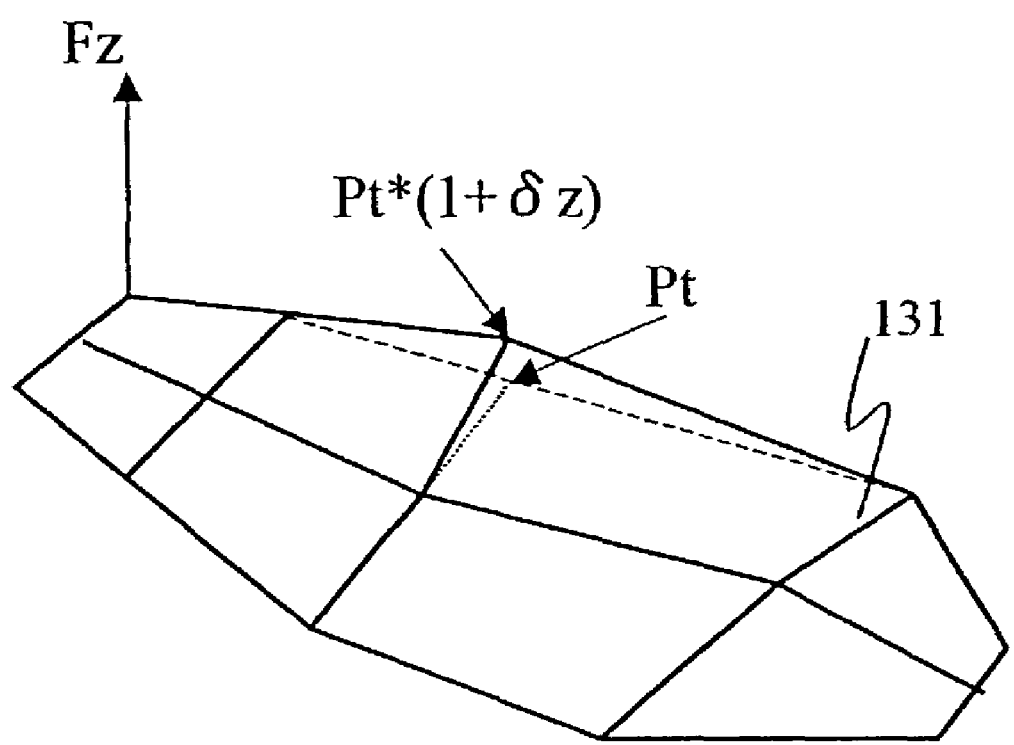
FIG. 13 is an illustration related to a method of sensitivity analysis in accordance with the first embodiment.

For example, assume that the fluid-structure interactive analysis is performed using a numerical value in which the z coordinate of the node Pt shown in FIG. 13 is changed to Pt×(1+δz), and component in the direction of gravitational acceleration Fz of the fulcrum reaction of wing 131 shown in FIG. 13 changes to Fz×(1+δf). Here, the change in the component in the direction of gravitational acceleration of the fulcrum reaction with respect to the change in z coordinate of node Pt, that is, the sensitivity, is defined as δf/δz.

Sensitivity analysis of the manner of flight, that is, sensitivity analysis of the manner of fluttering flight will be described. In the numerical model of the manner of fluttering, the attitude of the wing that changes time-sequentially, that is, time-sequential position data of the wing, is slightly changed for sensitivity analysis. Then, the numerical model related to the fluid and the numerical model related to the structure for the manner of fluttering resulting from the above described series of fluid-structure interactive analysis are compared with the numerical model related to the fluid and the numerical model related to the structure for the manner of fluttering before the change. Thus, sensitivity, that is, a change in a certain target parameter with respect to the change in the numerical model of the manner of fluttering is found. In other words, change in a specific numerical model resulting from the change in the numerical model of the manner of fluttering is calculated.

For example, assume that a numerical model, in which the amplitude θw of wing 121 shown in FIG. 12 is changed to θw×(1+δθ), is used and the above described fluid-structure interactive analysis is performed, and the component in the direction of gravitational acceleration Fz of the fulcrum reaction at the wing 121 shown in FIG. 12 changes to Fz×(1+δg). Here, the change in the component in the direction of gravitational acceleration of the fulcrum reaction resulting from the change in amplitude θw, that is, sensitivity, is defined as δg/δθ.

In the following, lift force of fluttering, which is important for fluttering flight, will be used as the target parameter, unless specified otherwise. More specifically, an average value of the force in the direction opposite to the gravitational acceleration exerted on the fulcrum of wing 121 per one period of fluttering of wing 121 shown in FIG. 12 is regarded as the specific target parameter of the present embodiment. When the value of the specific target parameter is positive, the fluttering robot rises, and if the value is negative, the fluttering robot lowers. When the specific target parameter value is approximately zero, the fluttering robot hovers. In the following, a method of obtaining the manner of flight in which the numerical model of the average value of the force in the direction opposite to the gravitational acceleration exerted on the fulcrum of the wing, which is prepared using the equivalent numerical model of actual structure of the wing before the change in the structure of the wing or the manner of fluttering, is made equal to the numerical model of the average value of the force in the direction opposite to the gravitational acceleration exerted on the fulcrum of the wing after the change in the structure of the wing or manner of fluttering, will be described.

(Obtaining Manner of Fluttering of Wings Having Different Shapes)

First, a method of obtaining the manner of fluttering when the wing shape is changed will be described. More specifically, referring to FIG. 14, a method will be described in which the manner of fluttering that ensures the same fluttering lift force as the fluttering lift force obtained by the equivalent numerical model of actual structure, by the numerical model of artificial wing 143 which is different from equivalent numerical model of actual structure used for preparing the fluid-structure interactive numerical model, will be described.

In the description of sensitivity analysis above, nodes are provided individually. When numerical models related to the wing structure are changed collectively based on a certain parameter, it is possible to find the sensitivity of a specific parameter with respect to the change in the numerical models related to the wing structure as a whole. As an example, the case will be considered in which sensitivity of fluttering lift force with respect to the change in the wing shape, that is, the change in manner of fluttering when the wing size is enlarged or reduced is calculated. When the wing size is magnified by (1+δ1) with the interpolation ratio being δ1, it is assumed that the fluttering lift force of the fluttering robot is magnified by (1+δ2).

Further, assume that when the amplitude θw of fluttering is magnified by (1+δ3), the fluttering lift force of the fluttering robot is magnified to (1+δ4). From these result, it follows that when the wing size is magnified by (1+δ1), fluttering lift force comparative to that before changing the wing size can be attained by magnifying the amplitude θw of fluttering by (1−δ3×δ2/δ4). When the change in the wing shape is replaced by one parameter and the change in lift force with respect to the change in the one parameter is calculated, the method of analysis can be simplified.

Figure 14:
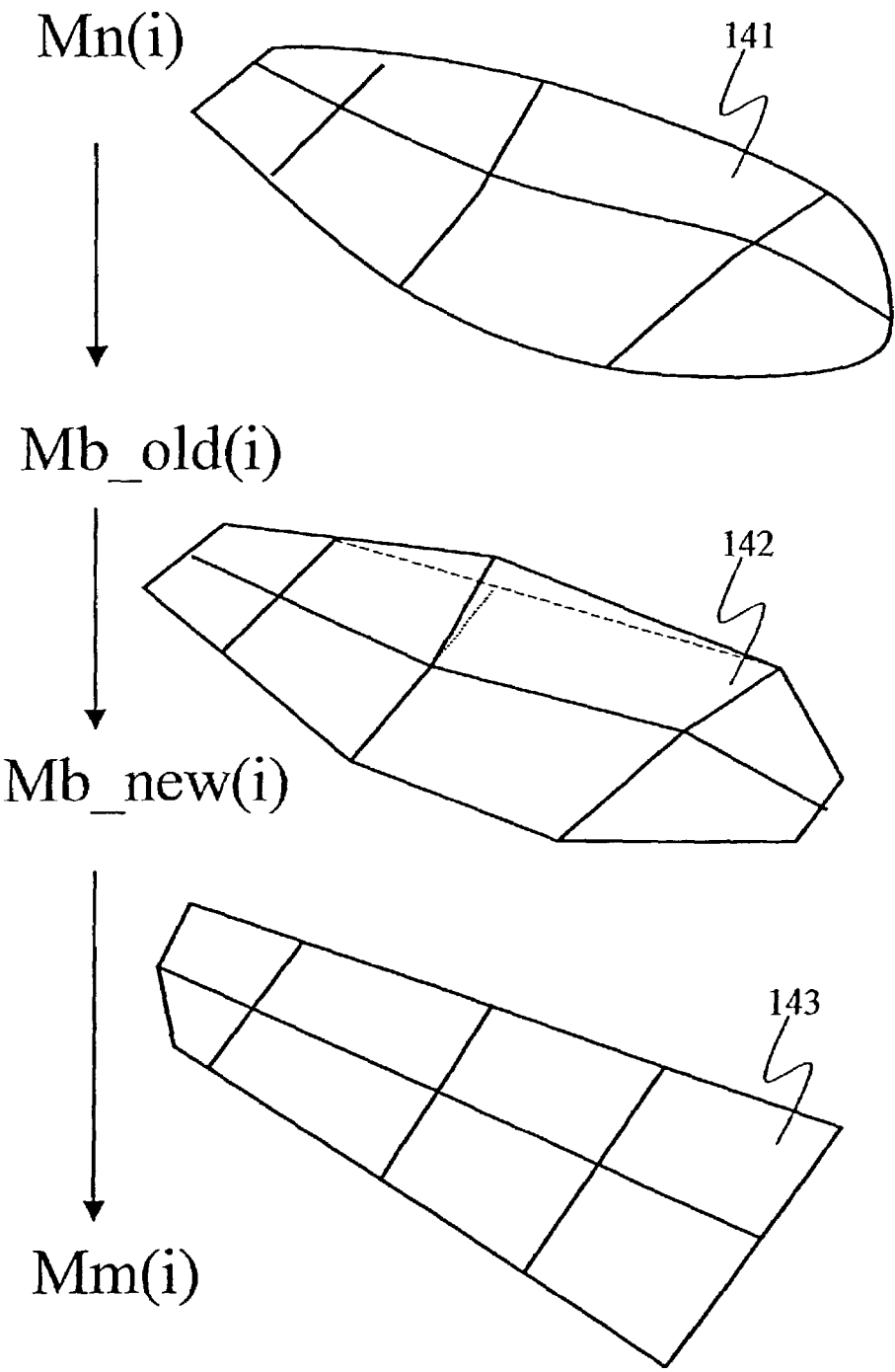
FIG. 14 is an illustration related to the method of interpolating wing shape in accordance with the first embodiment.

Consider that this method is further developed so that all the parameters representing the structure of the equivalent numerical model 141 of the actual structure of the wing are changed in accordance with one parameter. Referring to FIG. 14, a group of parameters Mm (i) representing parameters of numerical models related to the structure (shape and the like) of artificial wing 143, and a group of parameters Mn (i) representing parameters of numerical models related to the structure of the aforementioned equivalent numerical model of the actual structure of a dragon fly are defined.

Here, when the numerical model of the small change newly prepared by interpolation, that is, the group of parameters Mb_new (i) of the numerical model 142 of interpolated structure is set as follows, the parameter δ5 can be considered as the ratio of interpolation and can be handled in the similar manner as δ1 described above.

$$Mb\_old(i)=Mn(i)$$

$$Mb\_new(i)=Mb\_old(i)+\delta 5\times(Mm(i)-Mn(i)) \quad (1)$$

More specifically, it becomes possible to calculate the amplitude θw of fluttering that ensures the same lift force as Mn (i), with respect to Mb_new (i).

Further, the parameter group Mb_new (i) obtain as a result of analysis is newly regarded as Mb_old (i), and again the equation (1) is applied, whereby various sensitivity analysis and modification of the amplitude θw of fluttering based thereon are repeated.

By the repetition of such an operation, Mb_new (i) is updated and, accordingly, the amplitude θw of fluttering is modified. Thus, the amplitude θw of fluttering that realizes the same manner of fluttering lift as the original equivalent numerical model of actual structure Mn (i) for the new model Mm (i) can be found.

More specifically, referring to FIG. 14, relative arrangement of a mesh in the numerical model of the structure of artificial wing 143 is considered to be the same as the equivalent numerical model of actual structure 141, and only the positions of the nodes, thickness of each mesh and Young's modulus are changed. Through such an operation, the equivalent numerical model of actual structure is modified to be closer to the numerical model of artificial wing 143. As a result, the parameters included in Mm (i), Mn (i), Mb_old (i) and Mb_new (i), for example, may have common arrangements and may represent coordinates of the nodes, attitudes of the nodes, thickness of the mesh and Young's modulus of the mesh arranged next to each other. The group of parameters such as Mm (i) described here is only an example, and not limiting.

Though accuracy decreases, the above described method is also applicable by using some interpolation, even when relative positional relation of meshes is different.

Further, Mn (i) or the like may be a group of parameters of a function that represents wing shape or rigidity distribution. Here, the sensitivity analysis described above is on the premise that it is performed on a sufficiently small δ, where the change in each parameter can be assumed to be linear.

For simplicity of description, only the amplitude θw of fluttering has been described in connection with the change in the manner of fluttering. Actually, however, parameters representing lift other than the fluttering flight force also change, when the amplitude θw of fluttering is changed.

Therefore, actually, sensitivity of various parameters representing the manner of fluttering with respect to the fluttering force (forces related to fluttering other than the fluttering lift force: for example, thrust generated together with the fluttering lift force) is calculated, and a parameter representing such a manner of fluttering that offsets the change in the fluttering force mentioned above is calculated, as the numerical model of fluttering corresponding to the numerical model of the interpolated structure. More specifically, sets of parameters representing fluttering that cancel the change of fluttering force generated by the interpolation of the numerical model of structure are determined by using linear programming, for example, in consideration of the characteristics of actuator 122. Specifically, various parameters representing the manner of fluttering are positional data represented sequentially, provided on the node near the root of the wing, and the fluttering lift force is represented by the data of translational acceleration and data of rotational acceleration, on the body structure.

The foregoing descriptions will be summarized.

In the method of manufacturing a fluttering robot described above, first, a numerical model related to the structure of artificial wing 143 is prepared. Thereafter, a numerical model of detailed figure Mb_old (0)=Mn (0), which will be the reference for interpolation, is prepared. Thereafter, a numerical model for detailed motion N (0) corresponding to the manner of motion of the numerical model for detailed figure Mn (0) is prepared. The numerical model for detailed motion N (0) may be a numerical motion model corresponding to a numerical model of a structure of an artificial wing formed in advance. When the numerical motion model corresponding to the equivalent numerical model of actual structure prepared by measuring actual wings of the insect is used, however, the artificial wing 143 can be designed using the wings of an insect as a reference, and hence efficiency in design can be improved.

Thereafter, using the numerical model of detailed figure Mn (0) and detailed numerical motion model N (0), fluid-structure interactive analysis is performed, whereby a numerical model S (0) related to the structure of the numerical model of detailed structure Mn (0) and numerical model F (0) related to the fluid of the numerical model of detailed structure Mn (0) are calculated.

Thereafter, a first numerical model of interpolated structure Mb_new (1)=Mb_old (0)+δ5×(Mm (1)−Mn (0)) is prepared, by interpolating, with a prescribed interpolation ratio, the numerical model related to the structure of artificial wing 143 and the numerical model of detailed figure Mn (0).

Consider that the numerical model S (0) related to the structure and the numerical model F (0) related to the fluid are changed to numerical model S (1, 0) related to the structure and the numerical model F (1, 0) related to the fluid resulting from fluid-structure interactive analysis using the first numerical model of interpolated structure Mb_new (1) and the detailed numerical motion model N (0). The detailed numerical motion model N (0) is changed such that the degree of change of a specific numerical model (for example, lift force) becomes smaller than the degree of change of the specific numerical model resulting from the change caused by the interactive analysis. In this manner, a first numerical motion model of the interpolated structure N (1) that corresponds to the first numerical model of the interpolated structure Mb_new (1) is prepared.

Thereafter, fluid-structure interactive analysis is performed using the first numerical model of the interpolated structure Mb new (1) and the first numerical motion model of the interpolated structure N (1), a numerical model S (1) related to the structure of the first numerical model of the interpolated structure Mb_new (1) and the numerical model F (1) related to the fluid of the first numerical model of the interpolated structure Mb_new (1) are calculated.

Thereafter, a second numerical model of the interpolated structure Mb_new (2)=Mb_old (1)+δ5×(Mm (2)−Mn (1)) is prepared by interpolating, with a prescribed interpolation ratio, the numerical model related to the structure of artificial wing 143 and the first numerical model of the interpolated structure M_new (1).

Consider that the numerical model S (1) related to the structure and the numerical model F (1) related to the fluid are changed to numerical model S (2, 1) related to the structure and the numerical model F (2, 1) related to the fluid resulting from fluid-structure interactive analysis using the second numerical model of the interpolated structure Mb_new (2)

and the first numerical motion model of the interpolated structure N (1). The first numerical motion model of the interpolated structure N (1) is changed such that the degree of change of the specific numerical model (for example, lift force) becomes smaller than the degree of change of the specific numerical model resulting from the change caused by the interactive analysis. Thus, the second numerical motion model of the interpolated structure N (2) corresponding to the second numerical model of the interpolated structure Mb_new (2) is prepared.

Thereafter, fluid-structure interactive analysis is performed using the second numerical model of the interpolated structure Mb_new (2) and the second numerical motion model of the interpolated structure N (2), whereby the numerical model S (2) related to the structure of the second numerical model of the interpolated structure Mb_new (2) and the numerical model F (2) related to the fluid of the second numerical model of the interpolated structure Mb_new (2) are calculated.

Thereafter, by successively increasing the value i, respective numerical models described above (numerical motion model of interpolated structure N (i), numerical model S (i) related to the structure and numerical model F (i) related to the fluid) are successively updated, until the numerical model of interpolated structure Mb_new (i) matches or is approximated to the numerical model related to the structure of artificial wing 143.

Thus, the step of preparing numerical model of interpolated structure Mb_new (i), the step of preparing numerical motion model of interpolated structure N (i) and the step of preparing numerical model S (i) related to the structure and numerical model F (i) related to the fluid by performing fluid-structure interactive analysis are accumulatively repeated.

As a result, a numerical motion model of interpolated structure Mb_new (matching or approximated) corresponding to the numerical model of interpolated structure Mb_new (matching or approximated) that matches or is approximated to the numerical model related to the structure of artificial wing 143 is obtained. By using the numerical motion model of interpolated structure Mb_new (matching or approximated), the method of controlling the control apparatus 124 controlling the actuator drive circuit 123 is determined, for driving the artificial wing 143.

The numerical motion model of interpolated structure N (i) is a numerical motion model that corresponds to the numerical model of interpolated structure Mb_new (i). The numerical model S (i) related to the structure and the numerical model F (i) related to the fluid are numerical models resulting from fluid-structure interactive analysis under the condition that the wing in accordance with the numerical model of interpolated structure Mb_new (i) is caused to fly, fluttering in the manner in accordance with the numerical motion model of the interpolated structure N (i).

By this method, when the numerical model of interpolated structure Mb_new (i) is interpolated to be closer to the numerical model related to the structure of artificial wing 143, it becomes possible to realize fluttering flight of the manner of fluttering in accordance with the numerical motion model N (0) corresponding to the numerical model of detailed figure Mb_old (0) (for example, the equivalent numerical model of actual structure) by a numerical model related to the structure of the artificial wing 143 with respect to a specific numerical model (for example, lift force). As a result, it is possible to determine the manner of control of the control apparatus 124 controlling the actuator drive circuit 123 for driving artificial wing 143 such that even the artificial wing 143 attains the manner of fluttering close to the manner of fluttering of the detailed figure Mb_old (0) (for example, actual insect).

(Optimization of Wing Structure)

In the foregoing, a method has been described in which the wing structure is changed aiming at the structure of artificial wing 143 and the manner of fluttering is changed accordingly, so as to find the manner of fluttering of the artificial wing structure 143. It is also possible, by using sensitivity analysis, to obtain and prepare a new wing structure, by modifying the equivalent numerical model of actual structure to satisfy a certain specification.

More specifically, it is possible to prepare a wing structure that is suitable for a specification required for a certain fluttering robot. Speaking only of the wing shape, sensitivity of parameters of the manner of fluttering flight with respect to movement of each node of the wing in x, y and z directions, respectively, are calculated, each node of the wing is moved in accordance with the sensitivity of the manner of fluttering flight so that the parameters come close to optimal specification, and such operation is repeated.

More specifically, when the lift force by fluttering is to be maximized, sensitivity of fluttering lift force with respect to movement of each node of the wing is calculated, and each node is moved by a small amount in accordance with the sensitivity, so that the sensitivity increases. For example, a node of which sensitivity is negative is moved to the negative direction. It is noted that the sensitivity changes non-linearly, and therefore, sensitivity analysis must be newly performed for the change of the shape. Further, it is also possible to perform sensitivity analysis using parameters obtained by reducing characteristics of the wing. For example, it may be possible to prepare a wing structure by calculating ratio of enlargement of a wing that can obtain a certain fluttering lift force at a certain fluttering frequency with respect to the original wing.

(Optimization of the Manner of Fluttering)

The above described sensitivity analysis may be used by itself, to optimize the method of controlling the manner of fluttering flight of the fluttering robot.

For example, lift force in the fluttering of an insect may significantly fluctuate, as shown in FIG. 11. By changing the wing attitude, that is, time-sequential data of wing position based on the sensitivity analysis, it is possible to obtain a manner of fluttering with less fluctuation while maintaining the fluttering lift force. In this manner, it is possible to prepare a control method based on the required specification corresponding to the artificial article.

Further, it is also possible to consider a method of preparing numerical model of the manner of fluttering drive that brings about a prescribed manner of fluttering motion of the fluttering robot. This is attained by performing sensitivity analysis of the change in the manner of motion of the fluttering robot with respect to the change in W (i), where W (i) is a parameter representing the manner of driving the wing, and by changing the manner of fluttering drive based on the result of analysis.

Using such a method of preparing numerical model of the manner of fluttering flight, it is possible to study the nature of the numerical model of the manner of fluttering drive in a simple manner, even when the numerical model of the manner of fluttering drive does not satisfy the condition of lift. For example, in the conventional method through experiment, when the fluttering robot turns to the right, it is necessary to study the manner of fluttering drive that enables a right turn while the robot is in a lifted state. By the method using the numerical model of the manner of fluttering drive prepared in accordance with the fluid-structure interactive analysis of the present embodiment, it is possible to prepare a numerical model of the manner of fluttering flight for a right turn at first, and thereafter, to change the numerical model of the manner of fluttering flight such that the change in lift force resulting from the manner of fluttering drive for a right turn is compensated for.

(Optimization of Actuator Drive)

Similar to the discussion above, actuator drive can also be modified. For example, there may be a case in which driving of actuator 122 at a frequency higher than a prescribed value is undesirable, for example, a case in which the response of actuator 122 degrades in a high frequency range. In the following, a method of lowering driving frequency required for driving actuator 122 by changing the wing structure for such a case will be described.

Assume that the number of images obtained per one second by a high speed camera, that is, sampling frequency, is 2×fc. The highest control frequency for driving the wing 121 is fc. Here, lowpass filtering is performed at a frequency that satisfies fc×(1−δc) with respect to the manner of fluttering. Based on the thus determined manner of fluttering, the above described fluid-structure interactive analysis is performed. Further, sensitivity of fluttering lift force with respect to the change in filtering frequency is calculated. Further, sensitivity of fluttering force with respect to the change in shape of wing 121 as described above is also calculated.

By these sensitivities, it becomes possible to obtain the change in shape of wing 121 that can compensate for the change in fluttering lift force caused by the change in filtering frequency.

(Manufacturing of Fluttering Robot)

By combining the methods using sensitivity analysis described above, it is possible to obtain and prepare the manner of fluttering that can ensure similar fluttering lift force, based on the numerical models described above, even for a fluttering robot of which wing shape 121 is different from the equivalent numerical model of actual structure.

Further, it is possible to prepare the wing structure and control method thereof that take into consideration the driving characteristic of the actuator. Similar method may also be used, not only for the fluid-structure interactive numerical model described above but for the model of nervous system, model of driving muscles or model of information processing of an insect, to prepare a new numerical model based on the specification of an artifact, using the corresponding numerical model of the insect as a base, and to manufacture a fluttering robot based on the thus prepared numerical model. The procedures for manufacturing the fluttering robot are as shown generally in FIG. 1.

(Others)

(Modeling Procedures)

Dragon flies of the same species generally have the wings of the same shape, though there is individual difference. The wings have very complicated shape, and therefore, fine modeling of the structure or rigidity would be time-consuming.

In the fluid-structure interactive analysis of the present embodiment, as a method of optimizing the wing structure or the manner of motion, sensitivity analysis, which is the most explicit, has been used. It is also possible, however, to use different method as the method of optimization. Examples of other effective methods may include a method using learning with neural networks, and a method of optimization using genetic algorithm.

In the method of optimizing wing design using generic algorithm, first, each element of the group of parameters M (i) representing the numerical model of each wing structure described above is regarded as a gene and coded. Fluid-structure interactive analysis is performed on the numerical model of the wing structure represented thereby, performing a prescribed motion in the air. The result thus obtained is evaluated to be satisfactory or not, using some evaluation function, such as magnitude of the lift force. Based on the evaluation, numerical models having genes of satisfactory structure are multiplied (combined), and such a process is repeated, whereby a numerical model of a wing structure that is close to an optimal structure can be prepared.

The method of using gene algorithm can also be applied to preparation of a numerical model of the manner of fluttering motion. As an example, there is a method in which the parameter representing wing motion is given by W (i), and the gene algorithm is applied to W (i), in the same manner as to M (i). In this method, first, the following relations are set, where w is a function representing an angle of the wing with respect to a horizontal plane, T represents time for one period of fluttering, $\omega=2\times\pi/T$, $f_c$ represents maximum sampling frequency and n is an integer satisfying $0 \leq n \leq T/f_c$. Here, the parameter W (i) representing wing motion is reduced, for each frequency component, to the equation $w=A(n)\times\sin(n\times\omega\times t)+B(n)\times\cos(n\times\omega\times t)$, and sets of A (n) and B (n) for the parameter w representing each motion may be used as the numerical model of the manner of wing motion.

It is noted that the wing, when separated from the living organism, loses moisture rapidly, and hence rigidity thereof changes. From the same reason, it is necessary to maintain the physiological condition of the dragon fly while measurement is made.

In view of environmental protection, the dragon fly used for obtaining data should desirably be returned to the nature after the end of measurement, and the physiological condition of the insect should be maintained during measurement. When the measurement takes a long time, it becomes necessary to prepare water and feed, and to maintain temperature and moisture, and therefore, considerable labor and facility are necessary.

From the reasons above, though it is desirable to measure rigidity of the wing without damaging a dragon fly, it is difficult to measure fine shape or rigidity without breaking the wing. Therefore, in the present embodiment, a solution is made by preparing a sample used for fine measurement of the wing, and a separate sample used for measuring wing drive. If it is unnecessary to perfectly satisfy the above described conditions, it is possible to model the wing and the manner of fluttering, through different methods.

For example, if the measurements can be performed in a sufficiently short period of time as compared with the life of the insect for measurement, it is possible to prepare the equivalent numerical model of actual structure of the wing separately for each sample. Therefore, the series of processes for preparing the numerical model of detailed figure of the wing are not essential.

(Method of Fluid-Structure Interactive Analysis)

Various proposals have been made on the fluid-structure interactive analysis.

As the simplest method, it is possible to determine velocity by solving a moving boundary problem of the fluid only, from the video images of the wing picked-up by a high speed camera. The wing structure can be analyzed by deforming the structure by itself.

In this method, however, it is necessary to measure in every step of analysis the movement of every portion (point) of the wing. Therefore, the data amount would be formidable. Further, the analysis is limited to the results of fluttering flight, and therefore, this method cannot be used for an application to the fluttering robot described above.

A method solving a problem having interaction between fluid and the structure, weak coupling method in which determinant equations of fluid and structure are calculated alternately, and strong coupling method in which equations of the entire system including fluid and structure (coupling equations) are calculated at one time have been proposed. According Qun Zhang et al. mentioned above, it is most efficient and optimal to use the strong coupling method, to solve the problem having strong interaction between fluid and the structure, as in the present embodiment.

The fluid-structure interactive structural analysis of Qun Zhang et al. described above has been made on a structure other than a living organism. A fluid-structure interactive structural analysis of the present embodiment has been made on a behavior of a living organism, taking fluttering motion of an insect in the air as an example. It is the feature of the present invention that, by applying the fluid-structure interactive structural analysis to a living organism, manufacturing of a robot mimicking the living organism is facilitated.

Second Embodiment

The method of preparing the fluid-structure interactive numerical model in accordance with the second embodiment will be described with reference to Table 7 and FIGS. 21 to 26.

Figure 24:
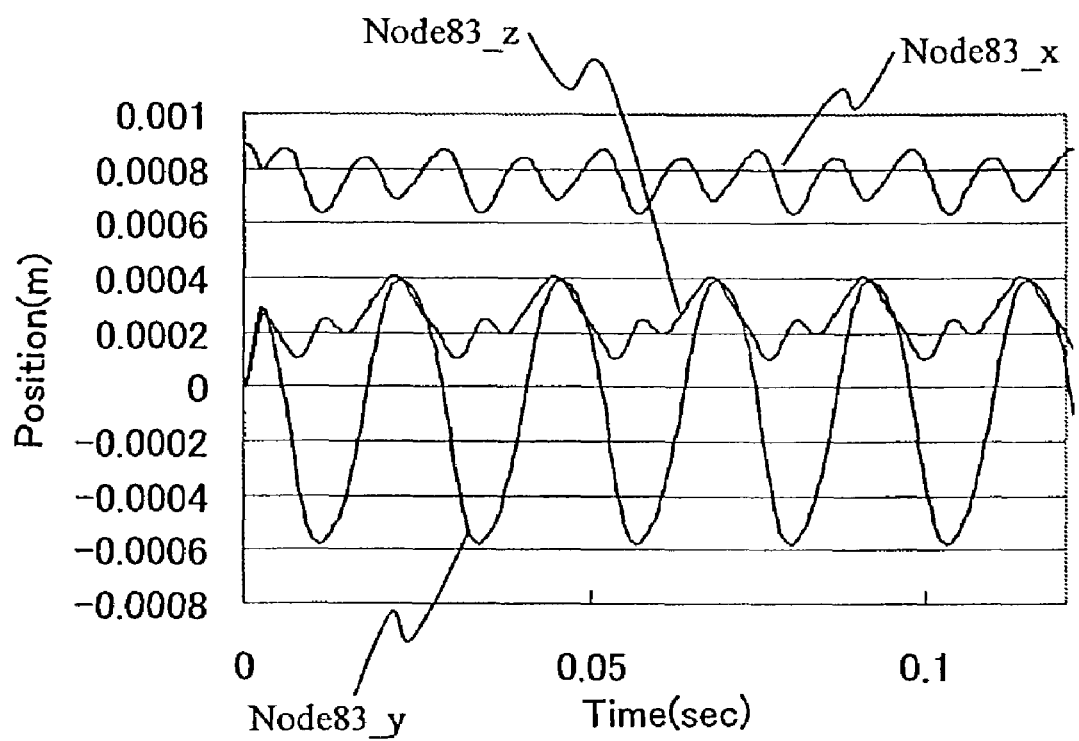
FIGS. 24 and 25 represent specific examples of equivalent numerical model of actual structure in accordance with the second embodiment.
Figure 25:
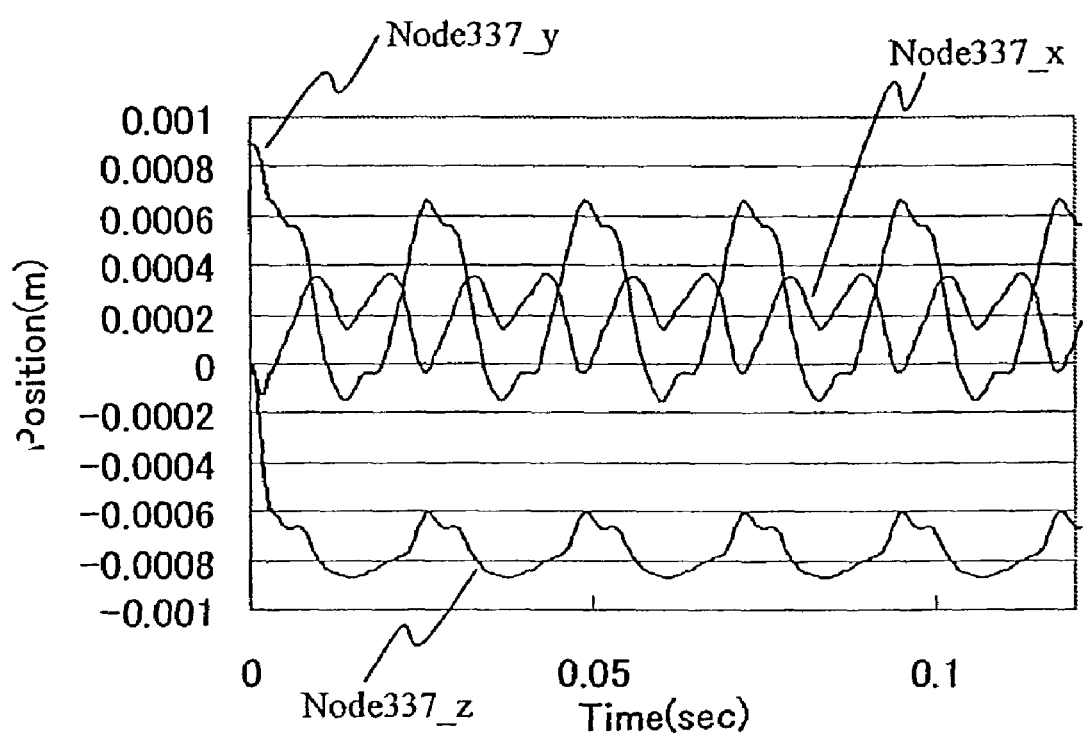

In the method of preparing fluid-structure interactive numerical model of the present embodiment, the relation between position and time shown in FIGS. 18 and 19 obtained in the first embodiment is changed to the relation shown in FIGS. 24 and 25.

Figure 26:
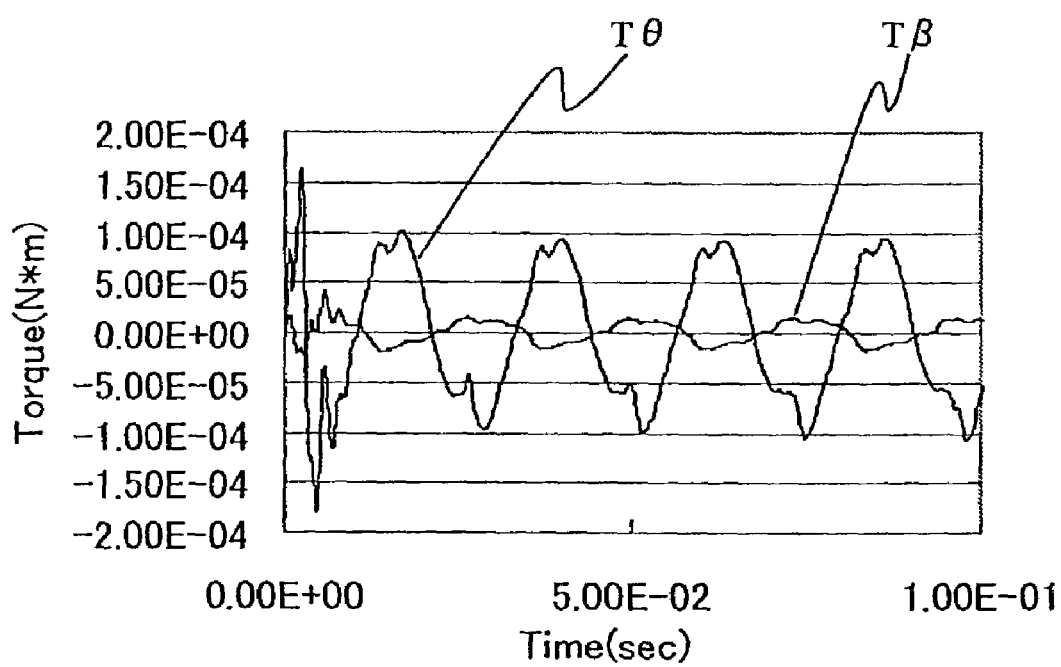
FIG. 26 is a graph representing driving torque exerted on the equivalent numerical model of actual structure in accordance with the second embodiment.

Further, in the method of preparing fluid-structure interactive numerical model of the present embodiment, the relation between torque and time shown in FIG. 20 obtained by the first embodiment is changed to the relation shown in FIG. 26. Here, referring to FIG. 26, Tθ represents a torque for obtaining driving in the θ direction, and Tβ represents torque for driving in the β direction.

In the method of preparing fluid-structure interactive numerical model of the present embodiment, the x and y coordinate values of Node83 of Table 1 used in the first embodiment are changed from 0.001 to 0.000889 and from 0.001 to 0.000889, respectively.

Further, in the method of preparing fluid-structure interactive numerical model of the present embodiment, Young's modulus, mass density and thickness of Table 4 used in the first embodiment are replaced from 1.00E+09 to 0.5E+09, from 1.2E+03 to 0.7E+03, and from 0.35E−03 to 4.5E−05, respectively.

In ShellMotion.dat, time-history of x, y and z coordinates at the nodes of the wing are as shown in Table 7, in place of those shown in Table 6.

TABLE 7

| Node/Time (sec) | 0 | 0.00003 | 0.00006 | 0.00009 | ... | 0.121 |
|---|---|---|---|---|---|---|
| Node71_x | 0 | 0 | 0 | 0 | ... | 0 |
| Node71_y | 0 | 0 | 0 | 0 | ... | 0 |
| Node71_z | 0 | 0 | 0 | 0 | ... | 0 |
| Node83_x | 0.000889 | 0.000889 | 0.000889 | 0.000889 | ... | 0.000874 |
| Node83_y | 0 | 1.15E−07 | 4.56E−07 | 1.02E−06 | ... | −6.5E−05 |
| Node83_z | 0 | 9.04E−08 | 3.59E−07 | 8.02E−07 | ... | 0.000148 |
| Node337_x | 0 | −1.1E−07 | −4.6E−07 | −1E−06 | ... | 0.000155 |
| Node337_y | 0.000889 | 0.000889 | 0.000889 | 0.000889 | ... | 0.00056 |
| Node337_z | 0 | −1.6E−07 | −6.4E−07 | −1.4E−06 | ... | −0.00067 |

Figure 4:
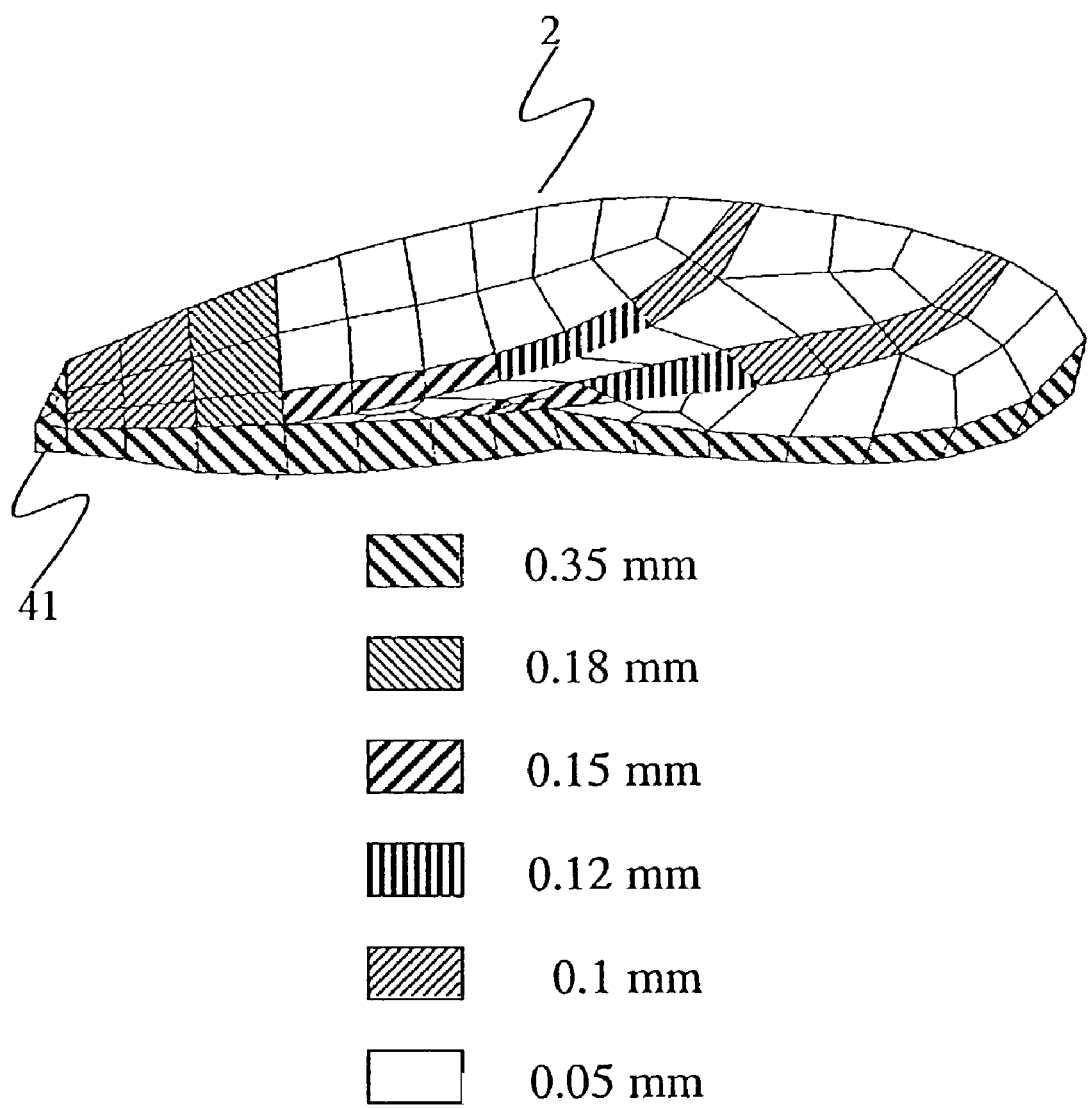
FIG. 4 represents wing thickness distribution related to the first embodiment.

The numerical model of the structure used in the method of preparing fluid-structure interactive numerical model of the present embodiment corresponds to the numerical model of the structure used in the method of preparing fluid-structure interactive numerical model of the first embodiment shown in FIG. 4, with the thicknesses of the wing changed, from 0.35 mm, 0.18 mm, 0.15 mm, 0.12 mm, 0.1 mm and 0.05 mm, respectively, to 0.045 mm, 0.012 mm, 0.010 mm, 0.008 mm, 0.006 mm and 0.004 mm.

In the method of preparing fluid-structure interactive numerical model of the first embodiment, the fluttering motion is approximately in the vertical direction, and hence the direction of generation of the lift force is positive along the y axis in FIG. 17. In the method of preparing fluid-structure interactive numerical model of the present embodiment, the direction of fluttering is changed to approximately horizontal direction, and therefore, the lift force is generated in the direction positive along the z axis. Thus, the lift force in this direction is considered to be positive.

Figure 21:
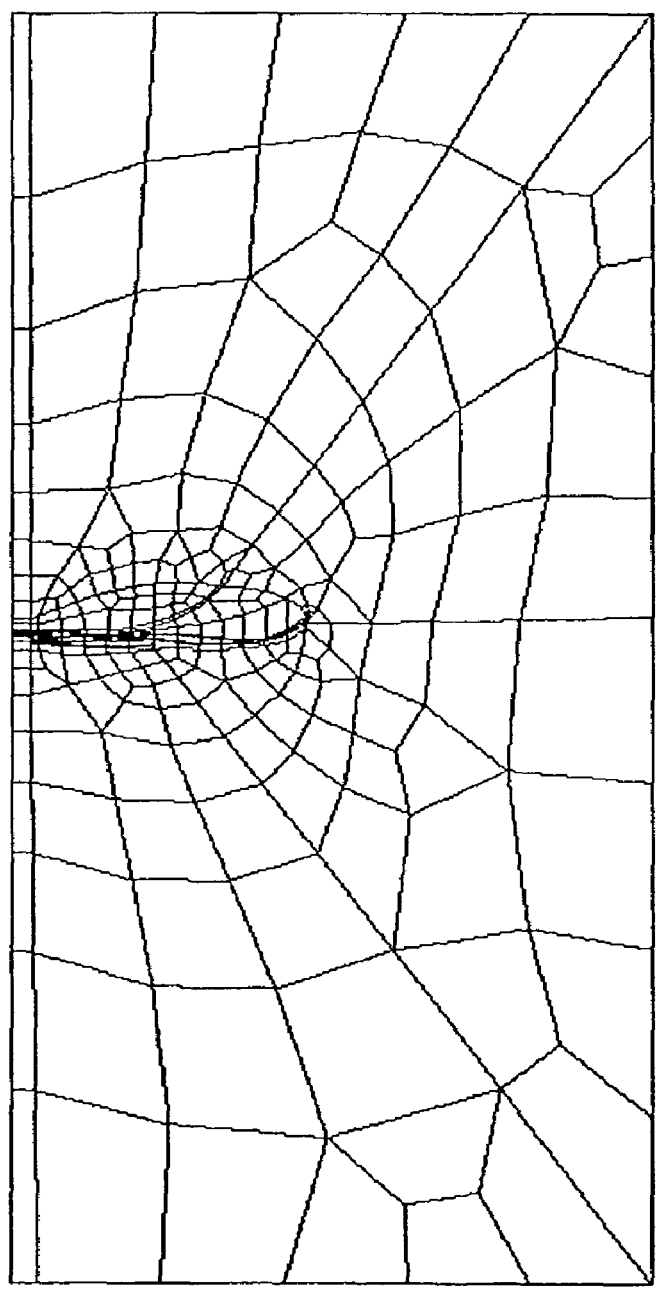
FIG. 21 is an illustration representing the method of preparing fluid mesh in accordance with the second embodiment.
Figure 22:
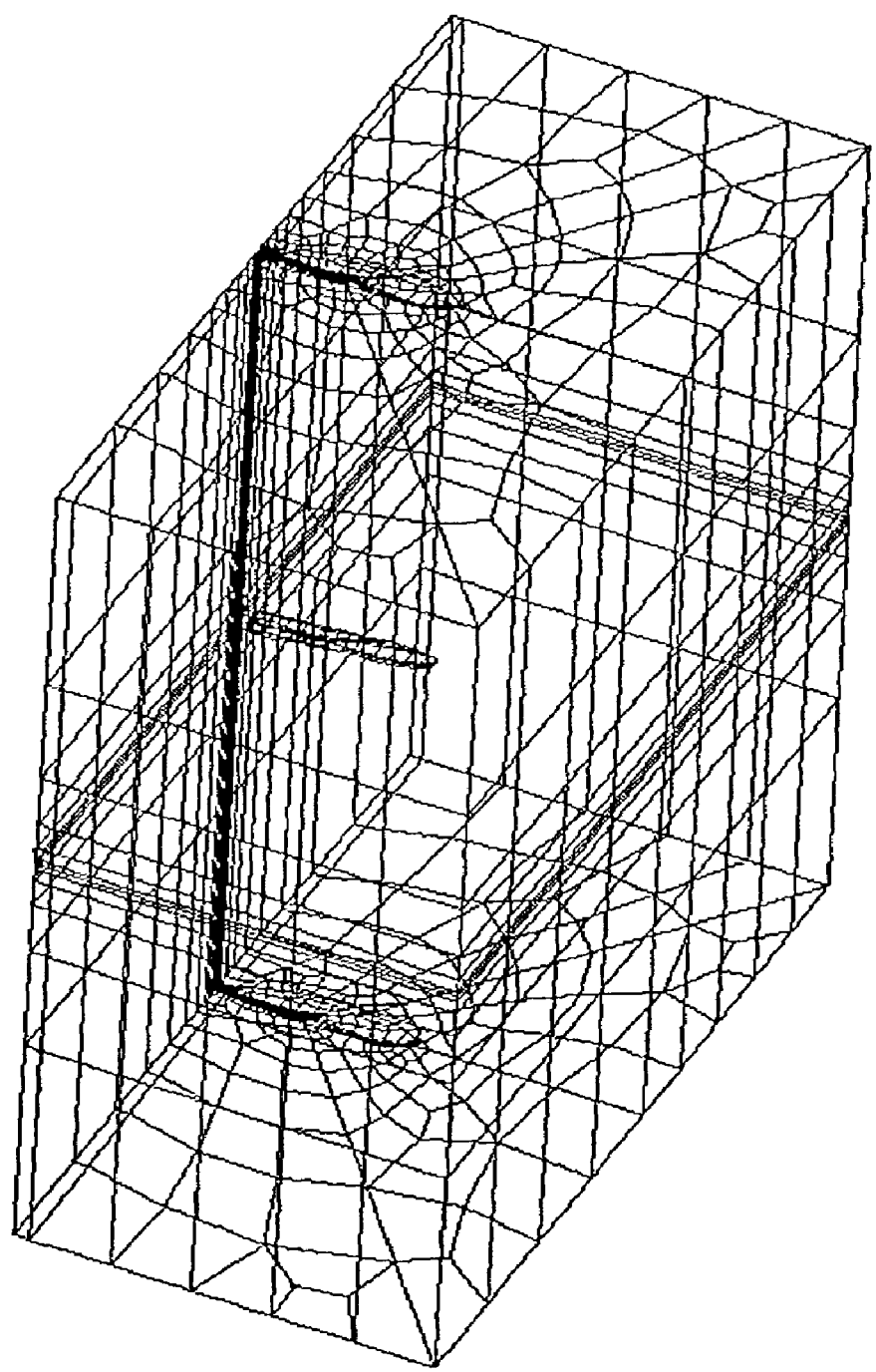
FIG. 22 represents an outline of the fluid mesh in accordance with the second embodiment.

In the method of preparing fluid-structure interactive numerical model of the present embodiment, the mesh structure shown in FIGS. 8 and 9 used in the first embodiment are replaced by the mesh structures shown in FIGS. 21 and 22.

Figure 23:
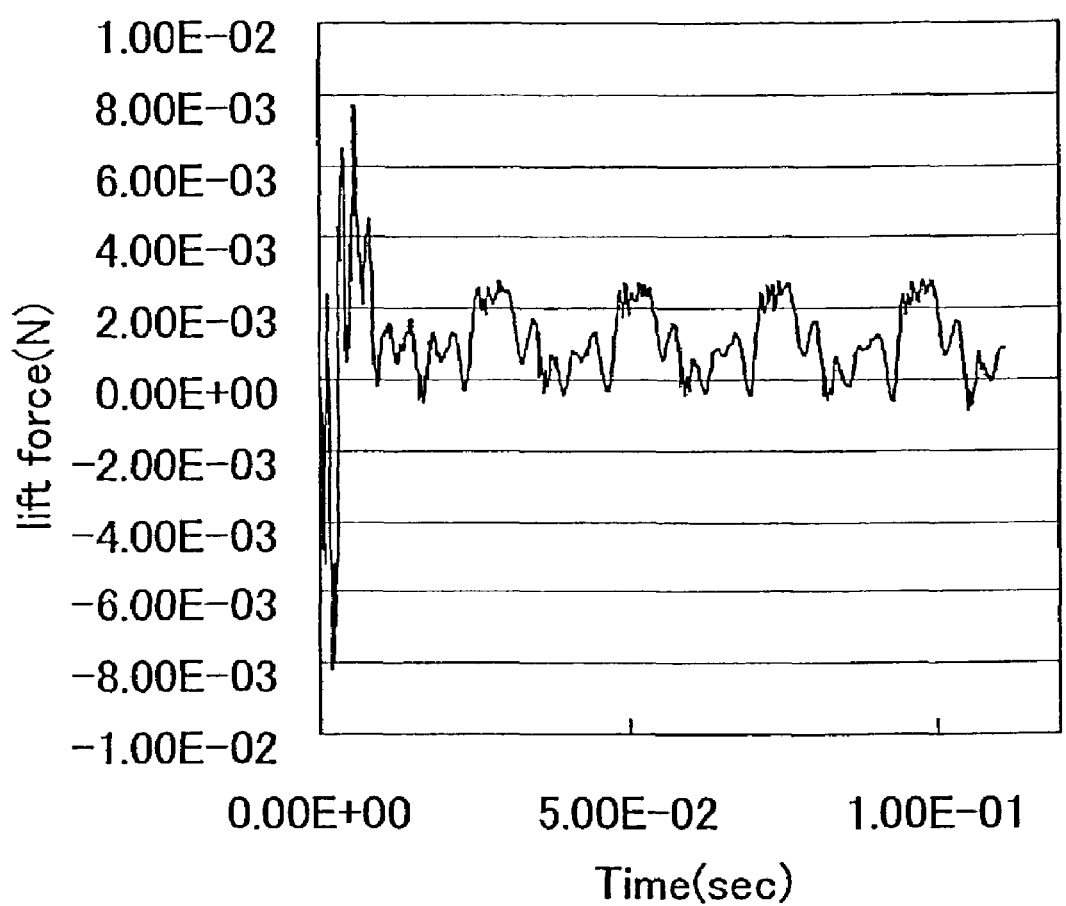
FIG. 23 represents transition of fulcrum reaction on the fulcrum of a wing, when the fluid-structure interactive numerical model flutters in accordance with the second embodiment.

Further, in the method of preparing fluid-structure interactive numerical model of the present embodiment, the relation between the lift force and time shown in FIG. 11 obtained by the first embodiment is as shown in FIG. 23.

As regards other figures and tables, the configuration and method used in the method of preparing fluid-structure interactive numerical model of the present embodiment are the same as those of the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of designing a fluttering robot, the fluttering robot including an artificial wing and a wing driving apparatus, said wing driving apparatus for controllably driving the artificial wing so as to achieve fluttering flight, said designing method comprising:

the step of preparing a numerical model (Model A) of artificial wing, preparing a numerical model (Model A) related to a structure of said artificial wing;

the step of preparing a numerical model (Model B) of a detailed figure of an actual wing, which will be a reference of interpolation;

the step of preparing a detailed numerical motion model (Model C), preparing detailed numerical motion model (Model C) corresponding to the manner of motion of said numerical model of detailed figure (Model B);

the step of detailed fluid-structure interactive analysis, calculating a numerical model (Model D) related to a structure of said numerical model (Model B) of detailed figure and a numerical model (Model E) related to fluid of said numerical model (Model B) of detailed figure, by performing fluid-structure interactive analysis, using said numerical model (Model B) of detailed figure and said detailed numerical motion model (Model C);

the step of preparing a first numerical model (Model 1F) of interpolated structure, preparing a first numerical model (Model 1F) of interpolated structure by interpolating the numerical model (Model A) related to the structure of said artificial wing and said numerical model (Model B) of detailed figure with a prescribed interpolation ratio;

the step of preparing a first numerical motion model (Model 1G) of the interpolated structure corresponding to said first numerical model (Model 1F) of the interpolated structure, using said first numerical model (Model 1F) of the interpolated structure and said detailed numerical motion model (Model C) and changing said detailed numerical motion model (Model C) such that a degree of change in a specific numerical motion model parameter is smaller than a degree of change in the specific numerical model parameter of the numerical model (Model D) related to the structure and the numerical model related to fluid (Model E) resulting from fluid-structure interactive analysis;

the step of first fluid-structure interactive analysis, calculating a numerical model (Model 1H) related to a structure of said first numerical model (Model 1F) of interpolated structure and a numerical model (Model 1J) related to fluid of said first numerical model of interpolated structure, by performing fluid-structure interactive analysis, using said first numerical model (Model 1F) of-interpolated structure and said first numerical motion model (Model 1G) of the interpolated structure;

the step of preparing a second numerical model (Model 2K) of interpolated structure by interpolating the numerical model (Model A) related to the structure of said artificial wing and said first numerical model (Model 1F) of interpolated structure with a prescribed interpolation ratio;

the step of preparing a second numerical motion model (Model 2L) of interpolated structure corresponding to said second numerical model (Model 2K) of interpolated structure, by changing said first numerical motion model (Model 1G) of the interpolated structure, such that a degree of change in a specific numerical motion model parameter of said first numerical motion model (Model 1G) of the interpolated structure is smaller than a degree of change in a specific numerical model parameter of the numerical model (Model D) related to the structure and the numerical model (Model E) related to fluid resulting from fluid-structure interactive analysis as determined using said second numerical model (Model 2K) of interpolated structure and said first numerical motion model (Model 2L) of the interpolated structure;

the step of second fluid-structure interactive analysis calculating a numerical model (Model 2M) related to a structure of said second numerical model (Model 2K) of interpolated structure and a numerical model (Model 2N) related to fluid of said second numerical model of interpolated structure, by performing fluid-structure interactive analysis, using said second numerical model (Model 2k) of interpolated structure and said second numerical motion model (Model 2L) of the interpolated structure;

comparing the second numerical model (Model 2K) of interpolated structure and the numerical model (Model A) related to a structure of said artificial wing to determine if the numerical model (Model 2K) of interpolated structure matches or is approximated with the numerical model (Model A) related to the structure of said artificial wing;

if it is determined that the models (Models A, 2K) of the artificial wing and the interpolated structure do match or are approximated, using the numerical motion model (Model 2K) of the interpolated structure corresponding to the numerical model of interpolated structure that matches or is approximated and determining operational characteristics of said wing driving apparatus so as to controllably drive the artificial wing; and if it is determined that the models (Models A, 2K) of the artificial wing and interpolated structures do not match or are not approximated, then repeating said steps of preparing a second numerical model (Model 2K) of interpolated structure, said step of preparing a second numerical motion model (Model 2L) of the interpolated structure and said second fluid-structure interactive analysis step, and then comparing the second numerical model (Model 2K) of interpolated structure, resulting from said repeating said steps, and the numerical model (Model A) related to a structure of said artificial wing.

2. The method of designing a fluttering robot according to claim 1, wherein said specific numerical model parameter is a numerical model of lift force, the lift force model being used to determine operational needs for the wing driving apparatus.

3. The method of designing a fluttering robot according to claim 1, wherein said step of preparing numerical model of the detailed figure includes:

actual structure measuring step of measuring physical values related to an actual structure of said structure, and the step of preparing equivalent numerical model of actual structure that can be regarded as equivalent to said actual structure, in which the physical values related to said actual structure measured in said actual structure measuring step are given as numerical values, whereby said numerical model of detailed figure is said equivalent numerical model of actual structure; and said actual structure is a wing of an insect, said fluid is air, and said prescribed motion is a fluttering motion.

* * * * *

UNITED STATES PATENT AND TRADEMARK OFFICE
CERTIFICATE OF CORRECTION

PATENT NO. : 7,584,084 B2
APPLICATION NO. : 10/299947
DATED : September 1, 2009
INVENTOR(S) : Hamamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Fourteenth Day of December, 2010

David J. Kappos
*Director of the United States Patent and Trademark Office*